(12) United States Patent
Son et al.

(10) Patent No.: US 8,053,131 B2
(45) Date of Patent: Nov. 8, 2011

(54) APPARATUS AND METHOD FOR DETERMINING DETERIORATION OF A FUEL CELL AND METHOD FOR PREVENTING DETERIORATION OF THE SAME

(75) Inventors: Ik Jae Son, Gyeonggi-do (KR); Byung Ki Ahn, Gyeonggi-do (KR); Tae Won Lim, Seoul (KR); Jong Hyun Lee, Gyeonggi-do (KR); Kwon Pil Park, Jeollanam-do (KR); Ho Lee, Jeollanam-do (KR); Chang Won Jung, Jeollanam-do (KR); Seung Chan Oh, Gyeonggi-do (KR); Jae Jun Ko, Gyeonggi-do (KR); Young Min Kim, Gyeonggi-do (KR); Sae Hoon Kim, Gyeonggi-do (KR); Jong Jin Yoon, Seoul (KR); Se Joon Im, Gyeonggi-do (KR)

(73) Assignees: Hyundai Motor Company, Seoul (KR); Industry-Academy Cooperation Foundation, SCNU, Suncheon, Jeollanam-do (KR)

( * ) Notice: Subject to any disclaimer, the term of this patent is extended or adjusted under 35 U.S.C. 154(b) by 513 days.

(21) Appl. No.: 12/361,221

(22) Filed: Jan. 28, 2009

(65) Prior Publication Data
US 2010/0040913 A1 Feb. 18, 2010

(30) Foreign Application Priority Data

Aug. 14, 2008 (KR) .................. 10-2008-0079751
Aug. 14, 2008 (KR) .................. 10-2008-0079752

(51) Int. Cl.
*H01M 8/04* (2006.01)
(52) U.S. Cl. ........................................ 429/450
(58) Field of Classification Search .................. 429/413, 429/428, 450
See application file for complete search history.

(56) References Cited

U.S. PATENT DOCUMENTS

| 7,041,405 | B2* | 5/2006 | Skiba et al. ............. 429/429 |
| 7,422,811 | B2* | 9/2008 | Yasumoto et al. ........ 429/431 |
| 2005/0130001 | A1* | 6/2005 | Yasumoto et al. ........ 429/22 |
| 2010/0141262 | A1* | 6/2010 | Watanabe et al. ........ 324/430 |

FOREIGN PATENT DOCUMENTS

| JP | 2005-011619 | 1/2005 |
| JP | 2005-174922 | 6/2005 |
| JP | 2006-179333 | 7/2006 |
| KR | 10-2008-0033527 | 4/2008 |

* cited by examiner

*Primary Examiner* — Javaid Nasri
(74) *Attorney, Agent, or Firm* — Edwards Angell Palmer & Dodge LLP; Peter F. Corless

(57) ABSTRACT

The present invention provides an apparatus and method for determining deterioration of a fuel cell, the method including measuring in real time fluoride ion concentration or pH value of outflow water from a fuel cell stack during operation in a fuel cell vehicle, calculating a fluoride emission rate from the measured value and, if the calculated fluoride emission rate is out of a predetermined normal range, determining deterioration of an electrolyte membrane of the fuel cell stack.

20 Claims, 18 Drawing Sheets

APPARATUS AND METHOD FOR DETERMINING DETERIORATION OF A FUEL CELL AND METHOD FOR PREVENTING DETERIORATION OF THE SAME

CROSS-REFERENCE TO RELATED APPLICATION

This application claims under 35 U.S.C. §119(a) the benefit of Korean Patent Application Nos. 10-2008-0079751 filed Aug. 14, 2008, and 10-2008-0079752 filed Aug. 14, 2008, the entire contents of which are incorporated herein by reference.

BACKGROUND (a) Technical Field

The present disclosure relates to an apparatus and method for determining deterioration of a fuel cell. More particularly, it relates to an apparatus and method for determining deterioration of an electrolyte membrane, which causes a reduction in performance and durability of a fuel cell stack, by checking the state of the electrolyte membrane of the fuel cell stack during operation in a fuel cell vehicle, and a method for preventing deterioration of the electrolyte membrane in the case where the deterioration of the electrolyte membrane is determined.

(b) Background Art

A fuel cell is an electricity generating system that does not convert chemical energy of fuel into heat by combustion, but electrochemically converts the chemical energy directly into electrical energy in a fuel cell stack.

One of the most attractive fuel cells for a vehicle is a proton exchange membrane fuel cell or a polymer electrolyte membrane fuel cell (PEMFC), which has the highest power density among known fuel cells. The PEMFC is operated at a low temperature, is able to start up in a short time and has a fast reaction time for power conversion.

The fuel cell stack included in the PEMFC preferably comprises a membrane electrode assembly (MEA), a gas diffusion layer (GDL), a gasket, a sealing member, and a bipolar plate. The MEA includes a polymer electrolyte membrane through which hydrogen ions are transported. An electrode/catalyst layer, in which an electrochemical reaction takes place, is disposed on each of both sides of the polymer electrolyte membrane. The GDL suitably functions to uniformly diffuse reactant gases and transmit generated electricity. The gasket suitably functions to provide an appropriate airtightness to reactant gases and coolant. The sealing member functions to provide an appropriate bonding pressure. The bipolar plate functions to suitably support the MEA and GDL, collect and transmit generated electricity, transmit reactant gases, transmit and remove reaction products, and transmit coolant to remove reaction heat, etc.

The fuel cell stack is preferably composed of a plurality of unit cells, each unit cell including an anode, a cathode and an electrolyte (electrolyte membrane). Hydrogen as a fuel is supplied to the anode ("fuel electrode" or "oxidation electrode") and oxygen (air) as an oxidizing agent is supplied to the cathode ("air electrode", "oxygen electrode" or "reduction electrode").

The hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate.

At the cathode, the hydrogen ions supplied through the (polymer) electrolyte membrane and the electrons transmitted through the bipolar plate react with the oxygen in the air supplied to the cathode to produce water.

Migration of the hydrogen ions causes electrons to flow through an external conducting wire, which generates electricity and heat.

The electrode reactions in the PEMFC can be represented by the following formulas:

Reaction in the fuel electrode: $2H_2 \rightarrow 4H^+ + 4e^-$

Reaction in the air electrode: $O_2 + 4H^+ + 4e^- \rightarrow 2H_2O$

Overall reaction: $2H_2 + O_2 \rightarrow 2H_2O$ + electrical energy + heat energy As shown in the above formulas, at the anode, a hydrogen molecule is dissociated into four hydrogen ions and four electrons. The generated electrons flows through an external circuit to generate electricity, and the generated hydrogen ions migrate to the cathode through the electrolyte membrane to perform a reduction electrode reaction. Accordingly, the theoretical potential is about 1.23 V.

The electrolyte membrane that transmits the hydrogen ions from the anode to the cathode is an important element in the durability of performance of the fuel cell stack. It is preferred to check the state of the electrolyte membrane in real time in the fuel cell stack during operation of the fuel cell vehicle and suitably ensure the durability performance of the electrolyte membrane.

Preferably, in order to ensure the durability performance of the electrolyte membrane, it is important to check deterioration, which causes a reduction in performance and durability of the fuel cell stack. Factors causing the deterioration include, but are not limited to, mechanical deterioration by heat and pressure, ion contamination, and electrochemical deterioration.

It has been reported that electrochemical deterioration is caused by chemical attack of the electrolyte membrane by hydrogen peroxide and hydroxyl radicals (Borup et al., "Scientific aspects of polymer electrolyte fuel cell durability and degradation", Chem. Rev. 2007 (107) 3904-3951). Borup et al. use the following formulas:

$H_2 + Pt \rightarrow Pt-H$ (at anode) [Step 1]

$Pt-H+O_2$ (diffused through PEM to anode) $\rightarrow .OOH$ (radical) [Step 2]

$.OOH + Pt-H \rightarrow H_2O_2$ [Step 3]

$H_2O_2 + M^{2+} \rightarrow M^{3+} + .OH + OH^-$ [Step 4]

$.OH + H_2O_2 \rightarrow H_2O + .OOH$ [Step 5]

Factors affecting the production of hydrogen peroxide and hydroxyl radicals include the operation voltage and temperature of the fuel cell stack, relative humidity (of reactant gases supplied to the fuel cell stack), and gas partial pressure (oxygen partial pressure in the air supplied to the fuel cell stack). The production rate of hydrogen peroxide and hydroxyl radicals is suitably high under conditions of high voltage, high temperature, low relative humidity and high gas partial pressure, and thereby the deterioration rate of the electrolyte membrane is suitably increased.

Preferably, examples of methods for checking the state of the electrolyte membrane include, but are not limited to, open circuit voltage (OCV) and OCV decay rate (ODR) measurement, linear sweep voltammetry (LSV) measurement as an electrochemical analysis method, and using an ion chromatography system capable of measuring the amount of dissolved fluoride ions in real time.

U.S. Pat. No. 7,041,405 discloses a technique using a resistor to prevent deterioration of a fuel cell stack in a fuel cell vehicle due to high potential. Accordingly, the OCV and ODR methods of measurement for checking the state of the electrolyte membrane in real time are not preferable in terms of durability performance of the fuel cell stack.

In the case of the LSV measurement, which is the electrochemical analysis method, since it requires analysis using a unit cell, it is difficult to apply the method to the actual fuel cell stack for a vehicle, in which several hundreds of unit cells are stacked, however, it is preferable as a post-hoc analysis of the fuel cell stack.

In the case of the ion chromatography system that measures the amount of dissolved fluoride ions in real time, the system is very expensive. Accordingly, stationary fuel cell test equipment is provided in the fuel cell vehicle and used to analyze the state of the fuel cell stack.

Accordingly, it is necessary to provide a technique which can check in real time the state of the electrolyte membrane of the fuel cell stack in a vehicle during operation and issue a suitable warning for deterioration and a control technique which can suitably cope with the deterioration.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method which can suitably determine deterioration of an electrolyte membrane of a fuel cell stack in a vehicle during operation by checking the state of the electrolyte membrane in real time and issue a suitable warning for deterioration.

Moreover, the present invention provides a method which can suitably prevent deterioration of an electrolyte membrane of a fuel cell stack provided in a fuel cell vehicle.

In preferred embodiments, the present invention provides a method which can suitably determine the possibility of deterioration in an electrolyte membrane of a fuel cell stack in a vehicle during operation by checking the state of the electrolyte membrane in real time, issue a suitable warning for the deterioration, prevent the deterioration of the electrolyte membrane by controlling factors causing the deterioration, and suitably improve the performance and durability of the fuel cell stack.

In one aspect, the present invention provides an apparatus for suitably determining deterioration of a fuel cell, the apparatus preferably comprising: either or both of measuring devices including, but not limited to, a fluoride ion concentration meter and a pH meter for suitably detecting in real time fluoride ion concentration and pH of outflow water from a fuel cell stack during operation in a fuel cell vehicle; flow velocity measuring means for measuring the flow velocity of the outflow water from the fuel cell stack; and a controller for checking the state of an electrolyte membrane of the fuel cell stack by suitably calculating a fluoride emission rate based on the measured fluoride ion concentration or pH value and flow velocity data of the outflow water from the fuel cell stack and, if the fluoride emission rate is out of a predetermined normal range, suitably determining that there is a possibility of deterioration of the electrolyte membrane.

In another aspect, the present invention provides a method for determining deterioration of a fuel cell, the method comprising: (a) measuring in real time fluoride ion concentration and pH of outflow water from a fuel cell stack using either or both of measuring devices including, but not limited to, a fluoride ion concentration meter and a pH meter in a fuel cell vehicle, and suitably measuring flow velocity of the outflow water from the fuel cell stack using flow velocity measuring means; and (b) checking, at a controller, the state of an electrolyte membrane of the fuel cell stack by preferably calculating a fluoride emission rate based on the measured fluoride ion concentration or pH value and flow velocity data of the outflow water from the fuel cell stack and, if the fluoride emission rate is out of a predetermined normal range, suitably determining that there is a possibility of deterioration of the electrolyte membrane.

In still another aspect, the present invention provides a method for preventing deterioration of a fuel cell, the method comprising: (a) measuring in real time fluoride ion concentration and pH of outflow water from a fuel cell stack using either or both of measuring devices including, but not limited to, a fluoride ion concentration meter and a pH meter in a fuel cell vehicle, and measuring flow velocity of the outflow water from the fuel cell stack using flow velocity measuring means; (b) checking, at a controller, the state of an electrolyte membrane of the fuel cell stack by calculating a fluoride emission rate based on the measured fluoride ion concentration or pH value and flow velocity data of the outflow water from the fuel cell stack and, if the fluoride emission rate is out of a predetermined normal range, suitably determining that there is a possibility of deterioration of the electrolyte membrane; (c) examining a factor accelerating the current deterioration by suitably measuring operation voltage and operation voltage of the fuel cell stack, relative humidity of reactant gases supplied to the fuel cell stack, and oxygen partial pressure in the air supplied to the fuel cell stack using sensing means; and (d) controlling operation conditions of a vehicle and the fuel cell stack so that the corresponding factor is suitably controlled within a predetermined range for membrane stability.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention. The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
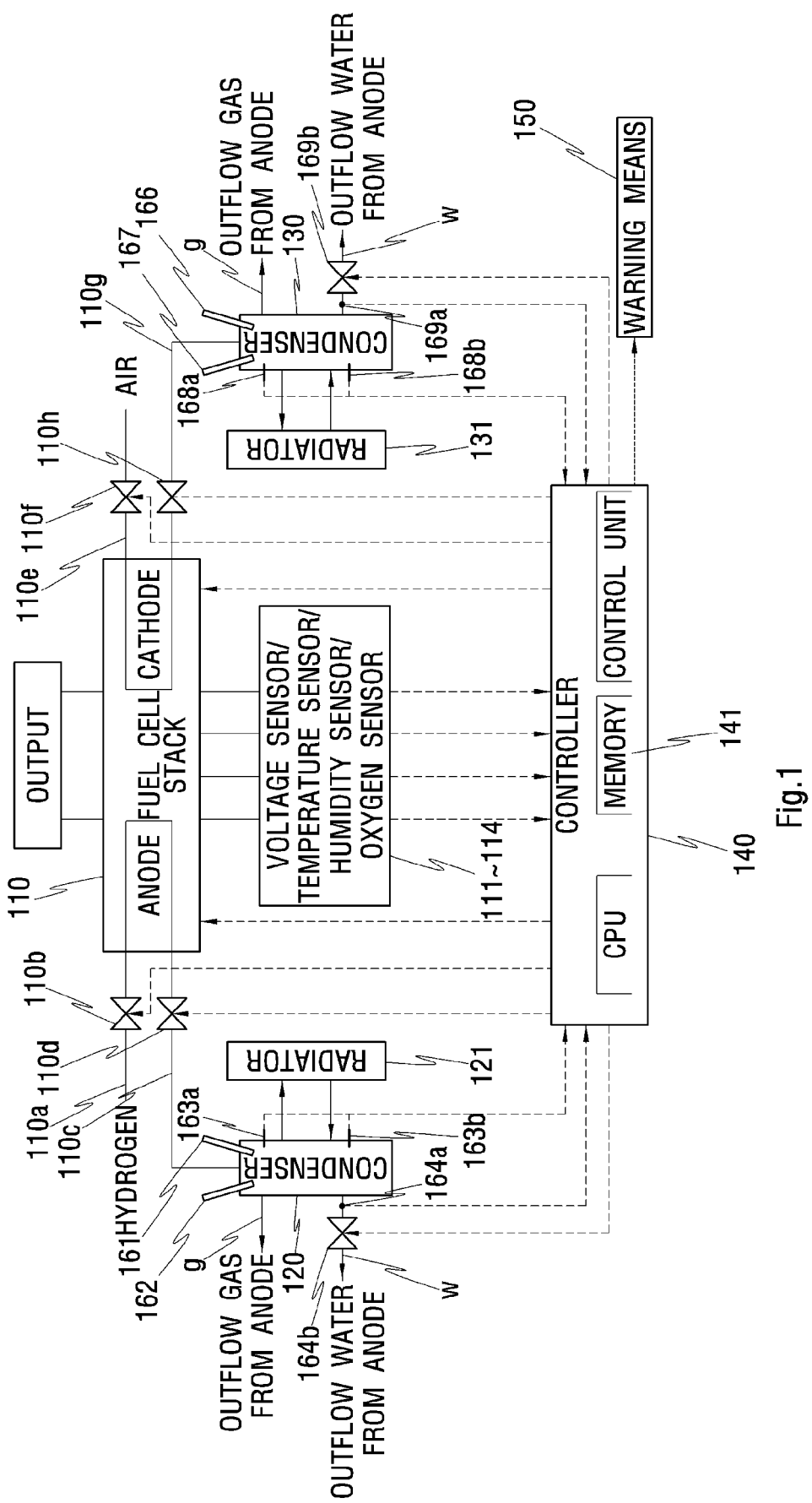
FIG. 1 is a schematic diagram showing a configuration of an apparatus for determining deterioration of an electrolyte membrane and issuing a warning in accordance with the present invention.

Reference numerals set forth in the Drawings include reference to the following elements as further discussed below:

| 110: fuel cell stack | 120, 130: condenser |
|---|---|
| 161, 166: pH meter | |
| 162, 167: fluoride ion concentration meter | |
| 140: controller | 150: warning means |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the invention features an apparatus for determining deterioration of a fuel cell, the apparatus comprising a measuring device for detecting in real time fluoride ion concentration and pH of outflow water from a fuel cell stack during operation in a fuel cell vehicle, a flow velocity measuring means for measuring the flow velocity of the outflow water from the fuel cell stack, and a controller for checking the state of an electrolyte membrane of the fuel cell stack and determining that there is a possibility of deterioration of the electrolyte membrane.

In one embodiment, the measuring device includes one or more of a fluoride ion concentration meter and a pH meter.

In another embodiment, the controller for checking the state of an electrolyte membrane of the fuel cell stack calculates a fluoride emission rate based on a measured fluoride ion concentration or pH value and flow velocity data of the outflow water from the fuel cell stack and, if the fluoride emission rate is out of a predetermined normal range, determining that there is a possibility of deterioration of the electrolyte membrane.

In another aspect, the invention features a method for determining deterioration of a fuel cell, the method comprising measuring in real time fluoride ion concentration and pH of outflow water from a fuel cell stack using one or more measuring devices, and measuring flow velocity of the outflow water from the fuel cell stack using flow velocity measuring means, checking, at a controller, the state of an electrolyte membrane of the fuel cell stack, and determining that there is a possibility of deterioration of the electrolyte membrane.

In one embodiment the one or more measuring devices include a fluoride ion concentration meter and a pH meter in a fuel cell vehicle.

In another embodiment, checking the state of an electrolyte membrane of the fuel cell stack comprises calculating a fluoride emission rate based on the measured fluoride ion concentration or pH value and flow velocity data of the outflow water from the fuel cell stack and, if the fluoride emission rate is out of a predetermined normal range.

In another aspect, the invention features a method for preventing deterioration of a fuel cell, the method comprising measuring in real time fluoride ion concentration and pH of outflow water from a fuel cell stack using either or both of measuring devices including a fluoride ion concentration meter and a pH meter in a fuel cell vehicle, and measuring flow velocity of the outflow water from the fuel cell stack using flow velocity measuring means, checking, at a controller, the state of an electrolyte membrane of the fuel cell stack by calculating a fluoride emission rate based on the measured fluoride ion concentration or pH value and flow velocity data of the outflow water from the fuel cell stack and, if the fluoride emission rate is out of a predetermined normal range, determining that there is a possibility of deterioration of the electrolyte membrane, and examining a factor accelerating the current deterioration by measuring operation voltage and operation voltage of the fuel cell stack, relative humidity of reactant gases supplied to the fuel cell stack, and oxygen partial pressure in the air supplied to the fuel cell stack using sensing means; and controlling operation conditions of a vehicle and the fuel cell stack so that the corresponding factor is controlled within a predetermined range for membrane stability.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an apparatus and method for suitably determining deterioration of an electrolyte membrane, which causes a reduction in performance and durability of a fuel cell stack, by measuring in real time the amount of dissolved fluoride ions due to the deterioration of the electrolyte membrane, or the change in pH of outflow water (cathode outflow water/anode outflow water) due to the dissolved fluoride ions.

In preferred embodiments, the present invention provides a method for suitably preventing deterioration of an electrolyte membrane, which causes a reduction in performance and durability of a fuel cell stack, in which the amount of dissolved fluoride ions due to the deterioration of the electrolyte membrane or the change in pH of outflow water (cathode outflow water/anode outflow water) dissolved fluoride ions is measured in real time to check the state of the electrolyte membrane, issue a suitable warning if there is a possibility of deterioration in the electrolyte membrane, and suitably control factors accelerating the deterioration such as, but not limited to, the operation voltage and temperature of the fuel cell stack, the relative humidity (of reactant gases supplied to the fuel cell stack), and the gas partial pressure (oxygen partial pressure in the air supplied to the fuel cell stack).

Preferably, fluoride ions are released to the outside of a membrane electrode assembly (MEA) in the event that the electrolyte membrane in a polymer electrolyte membrane fuel cell (PEMFC) loaded on a fuel cell vehicle is electrochemically deteriorated. In preferred embodiments, the deterioration rate of the electrolyte membrane can be obtained by calculating a fluoride emission rate (FER).

Preferably, the FER can be calculated from the concentration of fluoride ions dissolved in outflow water from the fuel cell stack or by simply measuring the pH of the outflow water since the concentration of fluoride ions is associated with the pH of the outflow water from the fuel cell stack. Accordingly, in the present invention, the fluoride ion concentration or the pH of the outflow water is preferably measured in real time during vehicle operation so as to suitably control operation conditions through a controller in the event of an increase in the deterioration rate of the electrolyte membrane, and thus ensure durability performance of the electrolyte membrane.

FIG. 1 is a schematic diagram showing an exemplary configuration of an apparatus for suitably determining deterioration of an electrolyte membrane and issuing a warning in accordance with preferred embodiments of the present invention.

According to preferred embodiments of the invention, the apparatus for suitably determining deterioration of the electrolyte membrane in accordance with the present invention includes, but ids not limited to, at least one of a fluoride ion concentration meter and a pH meter, a flow velocity meter, and a controller. In certain embodiments, the fluoride ion concentration meter suitably detects in real time the fluoride ion concentration of outflow water from the fuel cell stack during operation in the fuel cell vehicle, and the pH meter detects in real time the pH of the outflow water. In other embodiments, the flow velocity meter suitably measures the flow velocity of the outflow water. In other embodiments, the controller suitably calculates the fluoride emission rate based on flow velocity data of the outflow water to check the state of the electrolyte membrane of the fuel cell stack and, if the fluoride emission rate is out of a predetermined normal range, suitably determines that there is a possibility of deterioration of the electrolyte membrane. In further embodiments, the apparatus of the present invention may further include warning means driven by a control signal, output when the controller determines that there is the possibility of deterioration of the electrolyte membrane, and issuing a suitable warning for the deterioration of the electrolyte membrane.

Referring to FIG. 1, the fuel cell stack 100 preferably has a structure in which a plurality of unit cells is stacked and suitably includes an anode ("hydrogen electrode") and a cathode ("air electrode"). Preferably, hydrogen and air are supplied to the anode and the cathode through pipes 110*a* and 110*e* and valves 110*b* and 110*f* at inlets thereof, respectively. Exhaust gases discharged from the anode and the cathode after reactions and product water produced by the fuel cell reaction flow out through pipes 110*c* and 110*g* and valves 110*d* and 110*h* at outlets thereof, respectively.

Preferably, condensers 120 and 130 capable of condensing water in the exhaust gases, discharged from the anode and the cathode, are suitably installed in the pipes 110*c* and 110*g* of the fuel cell stack 110. The fluoride ion concentration meters 162 and 167 for measuring the fluoride ion concentration of collected water (outflow water including condensed water and product water) or the pH meters 161 and 166 for measuring the pH of the collected water are suitably installed in respective condensers 120 and 130.

According to preferred embodiments of the invention, the condensed water, in which the exhaust gases discharged from the anode and the cathode of the fuel cell stack 110 are condensed, and the product water produced by the fuel cell reaction are collected in the condensers 120 and 130, and the exhaust gases, from which water is removed in the condensers 120 and 130, are suitably discharged through gas pipes g at outlets of the condensers 120 and 130, respectively. Preferably, a drain pipe for discharging water (outflow water including the condensed water and the product water) is installed in the respective condensers 120 and 130.

In preferred embodiments of the present invention, a typical refrigerant circulating condenser may be used to suitably cool the exhaust gases. Preferably, radiators 121 and 131 are connected to the respective condensers 120 and 130, and refrigerant circulates between the condensers 120 and 130 and the radiators 121 and 131 to suitably perform heat exchange. For example, in certain embodiments, a condenser in which refrigerant is kept at a temperature range of −3 to 3☐ is circulated may preferably be used, and the refrigerant comes in contact with the exhaust gases of the fuel cell stack to suitably condense most of the water. Since the relative humidity of the PEMFC operated at a temperature range of 65 to 80☐ is about 40 to 90%, water and saturated vapor are suitably simultaneously discharged from gas outlets of the fuel cell stack, if the temperature of the gas outlets is equal to or slightly higher than room temperature. Accordingly, in preferred embodiments, the heat exchange is suitably performed to condense most of the water in order to prevent fluoride ions or other ions in the vapor, which are not yet measured, from being released to the outside.

In further preferred embodiments of the invention described herein, the fluoride ion concentration or the pH of the water collected in the condensers 120 and 130 for a predetermined period of time are suitably measured by the fluoride ion concentration meters 162 and 167 or the pH meters 161 and 166. Preferably, a fluoride ion selective electrode (ISE) capable of measuring the saturation concentration above $1\times10^{-7}$ may be suitably used as the fluoride ion concentration meter. In certain embodiments, it is preferable that all of the fluoride ion concentration meters and the pH meters have a suitably high sensitivity, chemical resistance, weather resistance, or impact resistance.

In preferred embodiments of the present invention, either or both of the fluoride ion concentration meters 162 and 167 and the pH meters 161 and 166 may be used to suitably calculate the fluoride emission rate (FER) which is a criterion for determining the deterioration. Since the fluoride ion concentration meter is relatively expensive, only the pH meter may be used and, in this case, the cost of constructing the apparatus is suitably reduced.

In preferred embodiments of the invention as described herein, the fluoride ion concentration meters 162 and 167 and the pH meters 161 and 166 suitably detect the fluoride ion concentration and the pH of outflow water and preferably apply suitable detection signals to the controller 140. Then, in further preferred embodiments, the controller 140 preferably calculates the fluoride emission rate (FER) using the detection signals from the fluoride ion concentration meters 162 and 167 and the pH meters 161 and 166 and, if the calculated value is out of a suitably predetermined normal range, determines that the deterioration rate of the membrane is abnormally high, issues a suitable warning through the warning means 150, and examines the factors causing the deterioration.

According to certain preferred embodiments of the invention as described herein, a reason that the criterion for determining the suitable deterioration of the electrolyte membrane is the FER calculated from the fluoride ion concentration or the pH of outflow water is that the membrane area of the fuel cell stack varies according to vehicle specifications.

In exemplary embodiments, the following formula 1 is preferably used to calculate the FER from the fluoride ion concentration of outflow water and the FER is defined as the amount of fluoride ions discharged per unit time and per membrane area:

Fluoride emission rate (FER)=(fluoride ion concentration×flow amount)/(time×membrane area)=(fluoride ion concentration×flow velocity)/(membrane area) [Formula 1]

wherein the unit of the fluoride ion concentration is ppm ($10^{-6}$ g/cm$^3$), the flow amount is cm$^3$, the time is min, the membrane area is cm$^2$, the flow velocity, (flow amount)/(time), is mlpm (cm$^3$/min).

As shown in the above formula, in order to suitably obtain the FER from the fluoride ion concentration, it is necessary to know the amount of outflow water from the fuel cell stack, in which fluoride ions are dissolved, (condensed water from exhaust gases and product water produced by the fuel cell reaction) and the time required for the corresponding amount of outflow water to be discharged from the fuel cell stack.

According to preferred embodiments of the invention as described herein, since the membrane area in formula 1 is an intrinsic value according to the specifications of the fuel cell stack, the FER is suitably calculated by measuring the fluoride ion concentration and the flow velocity of the outflow water in the condenser, or by measuring the fluoride ion concentration from a predetermined volume of outflow water in the condenser and the time required for the predetermined volume of outflow water to be discharged from the fuel cell stack.

Here, the flow velocity of the outflow water represents the generation rate of the outflow water, from which the fluoride ion concentration is measured, and the controller calculates the FER from the fluoride ion concentration and the generation rate (flow velocity=flow amount/time) of the outflow water, in which fluoride ions are dissolved.

The flow velocity of the outflow water from the fuel cell stack is proportional to the amount of the outflow water, discharged from the fuel cell stack to the condenser per unit time, and is measured by flow velocity measuring means. The flow amount in formula 1 is considered as the flow velocity to be measured along with time, and the flow velocity can be measured by a flow velocity meter or by measuring the time required for a predetermined volume of water to be filled in the condenser (flow amount/time).

According to preferred embodiments, where the flow velocity meters 164a and 169a are used as the flow velocity measuring means to measure the flow velocity of water discharged from the condensers 120 and 130, the flow velocity meters are suitably installed at the water outlet side (i.e., drain port) of the condensers or in the drain pipe w connected thereto so that detection values of the flow velocity meters are suitably input to the controller 140.

In other embodiments, in the case of measuring the time required for a predetermined volume of water to be filled in the condenser, the condensers 120 and 130 including the drain pipes w suitably capable of discharging water and electronically controlled valves 164b and 169b installed in the drain pipes w, and the flow velocity measuring means including upper water level sensors 163a and 168a and lower water level sensors 163b and 168b, installed in the condensers, are preferably used.

In further preferred embodiments, the upper water level sensors 163a and 168a and the lower water level sensors 163b and 168b are suitably installed in the condensers 120 and 130, and the electronically controlled valves 164b and 169b, opened to discharge the water collected in the condensers 120 and 130 under the control of the controller 140, are preferably installed in the drain pipes w, through which the collected water is charged from the condensers 120 and 130.

According to further preferred embodiments of the invention and as shown in formula 1, it can be necessary to know the fluoride ion concentration and the time required for a predetermined volume of water to be filled in the condensers 120 and 130 in order to suitably calculate the FER. Accordingly, in certain embodiments, the flow amount in formula 1 suitably corresponds to the volume in which water is filled between the lower water level sensors 163b and 168b and the upper water level sensors 163a and 168a in the condensers 120 and 130, and the time corresponds to the time required for the corresponding volume of water to be filled in the condensers 120 and 130. Preferably, the controller 140 measures the time required for water to be filled in the condensers 120 and 130, in a state where the volume between the lower water level sensors and the upper water level sensors is input in advance, and suitably calculates the FER from formula 1 using the volume and the time.

In preferred embodiments of the invention as described herein, the electronically controlled valves 164b and 169b are preferably provided to open and close the drawn pipes w under the control of the controller 140. Preferably, the controller 140 closes the electronically controlled valves 164b and 169b when water is suitably discharged through the drain pipes w until the water level is detected by the lower water level sensors 163b and 168b and suitably measures the time required for water to be filled until the water level is detected by the upper water level sensors 163a and 168a during operation of the fuel cell stack. Preferably, after measuring the time required for water to be filled until the water level is suitably detected by the upper water level sensors 163a and 168a, the controller 140 reopens the electronically controlled valves 164b and 169b to suitably discharge water until the water level is detected by the lower water level sensors 163b and 168b. According to further embodiments, in the above manner, the controller suitably measures the time, required for the predetermined volume of water to be filled, from the signals of the upper water level sensors 163a and 168a and the lower water level sensors 163b and 168b and then preferably opens the electronically controlled valves 164b and 169b to discharge water. In further preferred embodiments, the above-described process performed by the controller 140 is continuously repeated.

According to preferred embodiments of the invention, in the above method, the flow velocity data of the outflow water from the fuel cell stack is suitably obtained from the time, required for water to be filled from the lower water level sensors to the upper water level sensors in the condensers, and the volume between the two water level sensors, and the FER is suitably calculated at the time point when the water is filled. Accordingly, the interval of the FER data is suitably determined by the volume between the lower water level sensors and the upper water level sensors.

In certain further embodiments, the flow velocity data of the outflow water can be suitably obtained from the volume between the two water level sensors and the measured time, and thus the controller can suitably calculate the FER from the flow velocity data and the fluoride ion concentration values measured by the fluoride ion concentration meters of the outflow water collected in the condensers.

Preferably, the fluoride ion concentration is correlated with the pH, and the correlation between the fluoride ion concentration and the pH can be expressed by the following formula 2:

$$pH = 4.31 - 0.88 \log[F^-] \quad \text{[Formula 2]}$$

wherein [F$^-$] represents the fluoride ion concentration.

Preferably, the FER can be suitably calculated from the pH value detected by the pH meters 161 and 166 using formulas 1 and 2, instead of the fluoride ion concentration. Accordingly, since the fluoride ion concentration is correlated with the pH as shown in formula 2, the FER can be suitably calculated by measuring only the pH instead of the fluoride ion concentration.

In the above-described process of determining the deterioration of the electrolyte membrane, the condenser may be installed at one of the cathode outlet and the anode outlet, or suitably installed at both the cathode outlet and the anode outlet as shown in FIG. 1. In preferred embodiments, for example in the case where the condenser is preferably installed at both sides of the cathode outlet and the anode outlet, if any one of the fluoride emission rates (FERs) suitably calculated from the fluoride ion concentrations detected from the two condensers is out of a predetermined normal range, it is possible to determine that the deterioration of the membrane is accelerated and issue a suitable warning.

According to other further embodiments, in the present invention, the FER is calculated by measuring the fluoride ion concentration or the pH of the outflow water from the fuel cell stack and, if the FER value is out of the suitable normal range, the controller determines that the deterioration of the membrane is suitably accelerated, issues a suitable warning, and controls the factor causing the deterioration, thus preventing a reduction in durability of the electrolyte membrane due to the deterioration.

In preferred embodiments of the present invention, the factors causing an increase in the deterioration rate include, but are not limited only to, the operation voltage, temperature, relative humidity, and gas partial pressure of the fuel cell stack. Accordingly, if it is determined from the FER value that the deterioration of the membrane is suitably accelerated, the operation conditions of the vehicle and the fuel cell stack are preferably controlled so that the deterioration factors are within the normal range based on the voltage, temperature, relative humidity, and gas partial pressure of the fuel cell stack suitably measured by sensing means in real time.

For this purpose, as shown in FIG. 1, in certain preferred embodiments, the apparatus for suitably determining deterioration of the electrolyte membrane and issuing a warning in accordance with the present invention preferably includes a voltage sensor 111 for detecting the operation voltage of the fuel cell stack 110, a temperature sensor 112 for suitably detecting the operation temperature of the fuel cell stack 110, a humidity sensor 113 for suitably detecting the relative humidity of hydrogen supplied to the anode or air supplied to the cathode of the fuel cell stack 110, and an oxygen sensor 114 for suitably detecting the concentration of oxygen in the air supplied to the cathode of the fuel cell stack 110 to suitably measure the oxygen partial pressure.

Preferably, in further embodiments, sensors already mounted in the fuel cell system may be used as the above sensors. Preferably, as the voltage sensor 111 for detecting the operation voltage of the fuel cell stack 110, a voltage sensor included in an existing voltage monitoring system may be used. In other embodiments, as the temperature sensor 112 for detecting the operation temperature of the fuel cell stack 110, a coolant temperature sensor at the inlet side of the fuel cell stack 110 may preferably be used (refer to FIGS. 14 and 15). In still other embodiments, as the humidity sensor 113, a humidity sensor (113a and 113b in FIGS. 15 and 15) at the anode inlet side or at the cathode inlet side may be suitably used. IN other embodiments, as the oxygen sensor 114, an oxygen sensor provided at an outlet of an air blower may be suitably used (provided between an air blower 106 and a humidifier 107 in FIGS. 14 and 15). Examples of the oxygen sensor 114 include, but are not limited to, a yttria-stabilized zirconia (YSZ) sensor and a resistive sensor.

According to other preferred embodiments of the invention as described herein, the controller suitably determines the possibility of deterioration of the electrolyte membrane using the detection values of the fluoride ion concentration meters or the pH meters, issues a suitable warning, and at the same time examines the factors causing the deterioration. If any one of the deterioration factors such as, but not limited only to, the voltage, temperature, relative humidity, and gas partial pressure of the fuel cell stack is out of the suitable normal range, the controller takes necessary measures. Preferably, the controller examines the factor causing the deterioration and controls the corresponding factor to be within the normal range so that the deterioration rate of the electrolyte membrane is reduced. For example, if the temperature of the fuel cell stack is above 80☐, 85☐, 90☐, 95☐, preferably 90☐, if the voltage of the unit cell is above between 0.7-1.0 V, preferably 0.9 V, or if the relative humidity is between 105-30%, preferably 20%, the controller suitably controls the operation conditions of the vehicle and the fuel cell stack so that the temperature, voltage, and relative humidity are suitably kept in the normal range. Accordingly, the operation conditions are controlled based on the deterioration factors as described later.

According to exemplary embodiments of the present invention, experiments described herein have confirmed that the deterioration factors of the electrolyte membrane, for example such as the operation temperature and voltage of the fuel cell stack, the relative humidity (of reactant gases supplied to the fuel cell stack), and the gas partial pressure (oxygen partial pressure in the air supplied to the fuel cell stack), affect the performance of the fuel cell stack, which will now be described with reference to FIGS. 2 to 11.

Temperature of Fuel Cell Stack

Figure 2:
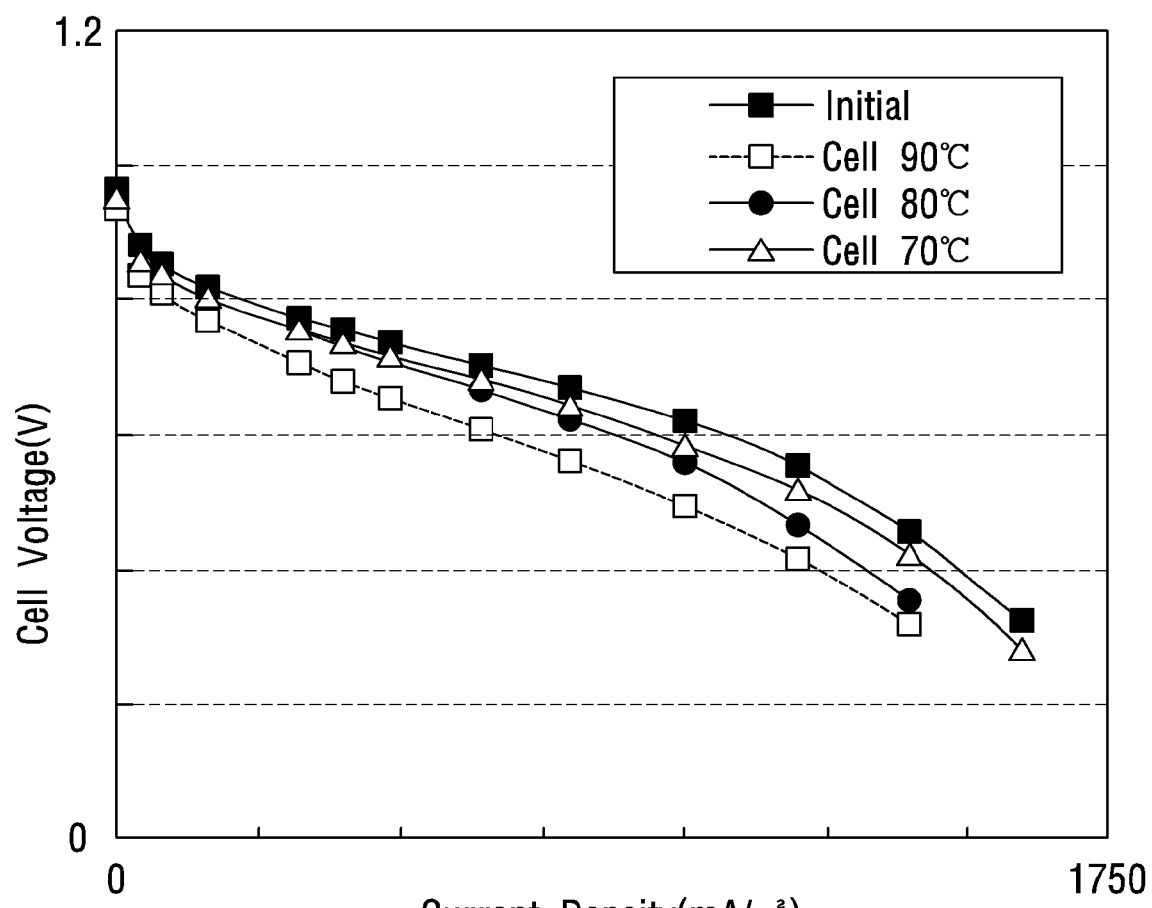
FIG. 2 is a diagram showing I-V characteristic curves at various operation temperatures of a fuel cell stack.
Figure 3:
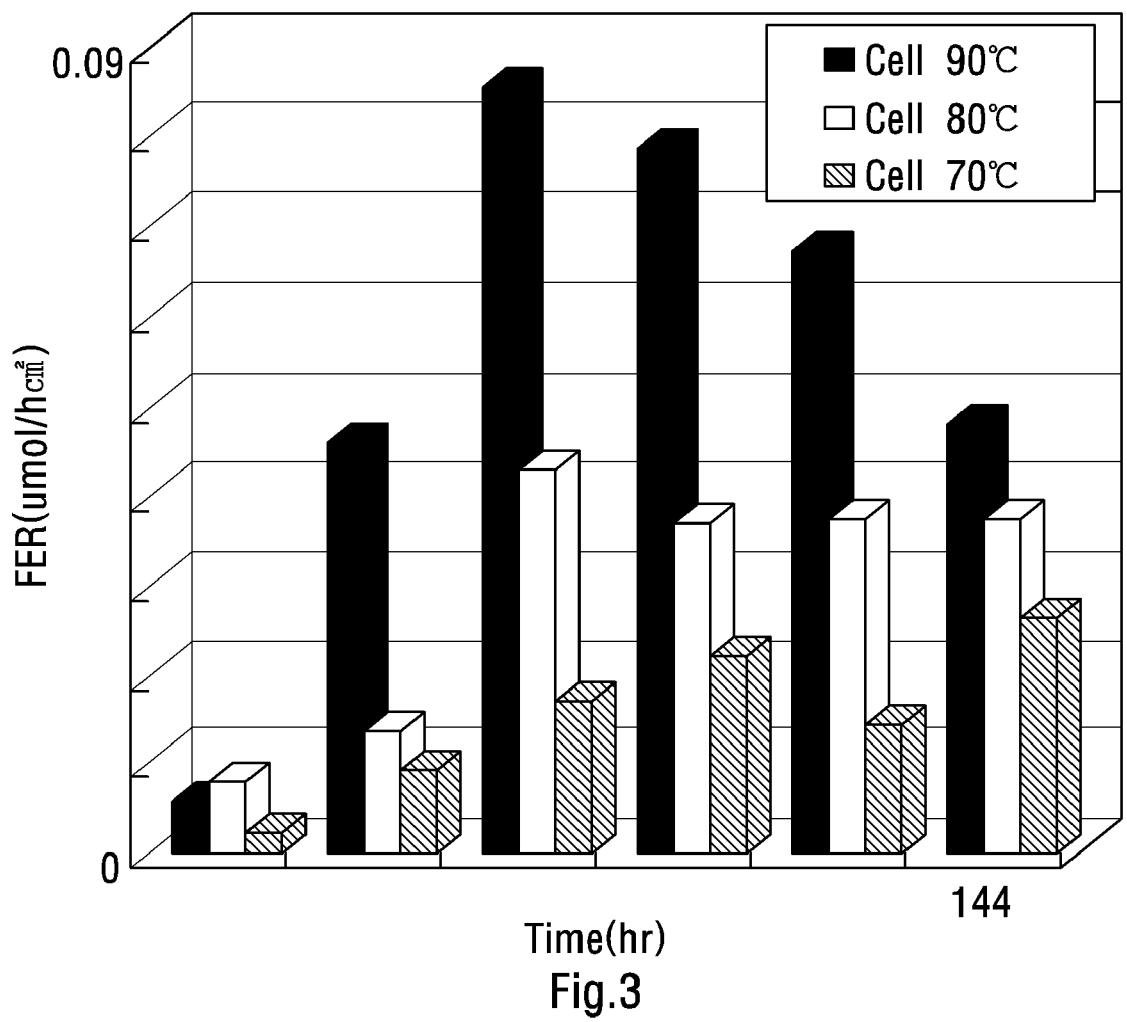
FIG. 3 is a diagram showing fluoride emission rates at various operation temperatures of a fuel cell stack.
Figure 4:
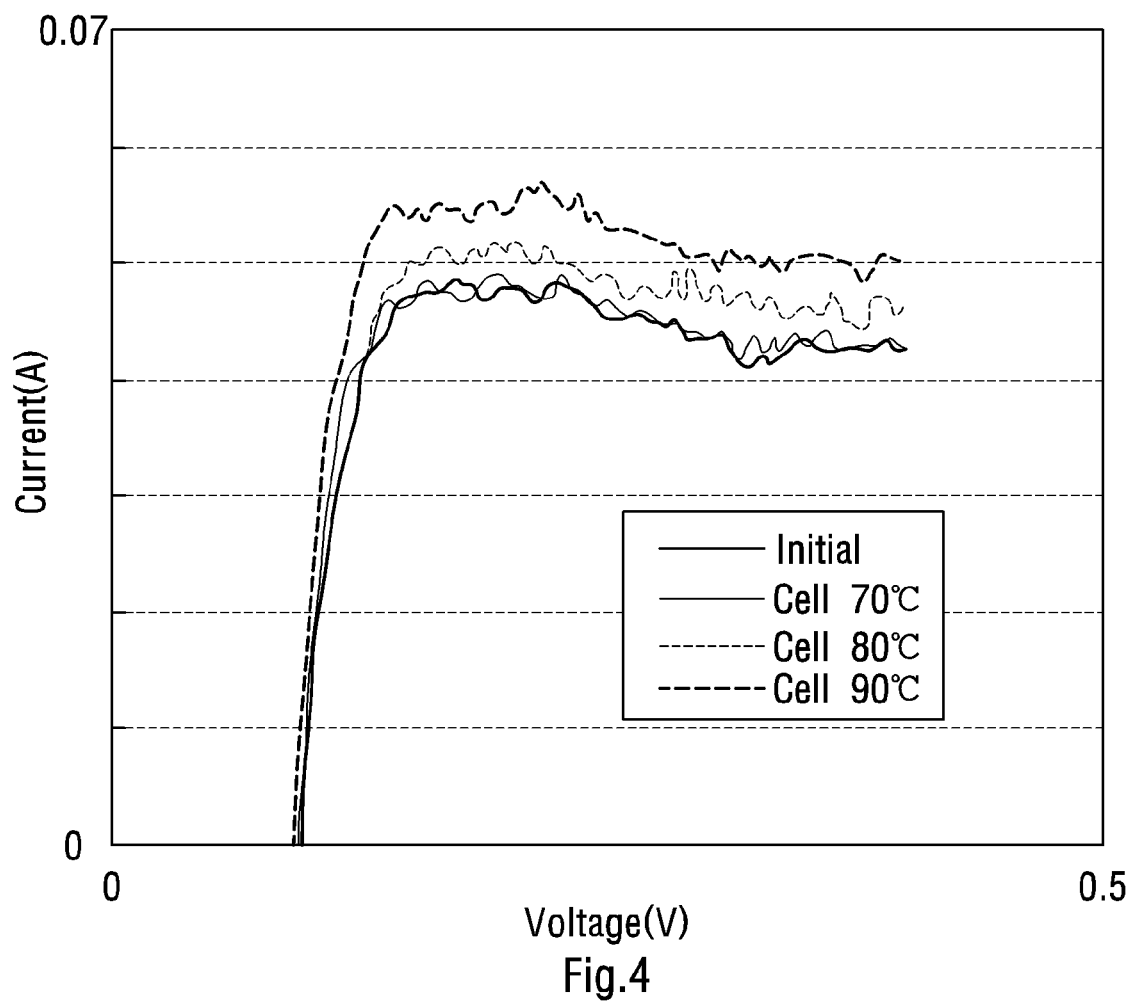
FIG. 4 is a diagram showing hydrogen permeation rates at various operation temperatures of a fuel cell stack.
Figure 5:
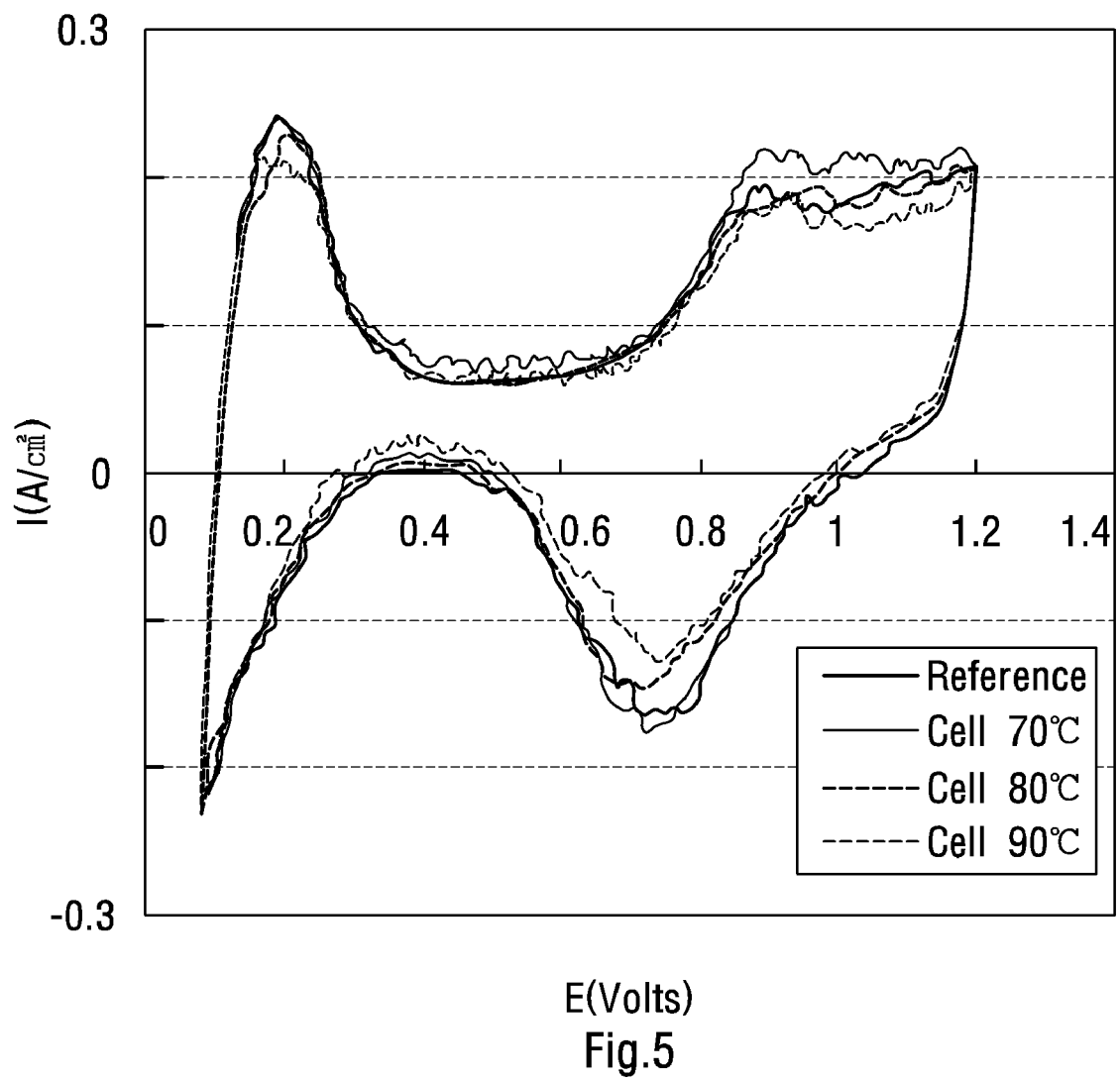
FIG. 5 is a diagram showing measurement results of cyclic voltammetry at various operation temperatures of a fuel cell stack.

According to certain preferred embodiments of the invention, after suitably measuring I-V characteristics ("Initial" in FIG. 2) at 80□ of a polymer electrolyte membrane fuel cell stack, dry gas was suitably supplied to the anode and gas having a relative humidity of about between 50%-75%, preferably 65%, was preferably supplied to the cathode in order to deteriorate the electrolyte membrane by excessive operation, and, preferably, the polymer electrolyte membrane fuel cell stack was operated at the open circuit voltage (OCV) at temperatures of 70□, 80□, and 90□ for 144 hours, respectively. In further preferred embodiments, the performance of the MEA was evaluated and the results are shown in FIG. 2. Accordingly, the deterioration degree of the polymer electrolyte membrane was confirmed by preferably measuring hydrogen permeation rate from linear sweep voltammetry (LSV) measurement and by measuring the FER of condensed water from the cathode. As the temperature rose, the performance was suitably decreased and the FER was suitably increased as shown in FIG. 3. Moreover, the hydrogen permeation rate was increased as the temperature rose as shown in FIG. 4. Accordingly, it can be seen that the deterioration rate of the membrane was increased with the increase in temperature and the deterioration rate of the membrane could be suitably measured with the FER. Furthermore, it was confirmed from the results of cyclic voltammetry in FIG. 5, obtained to examine the effects of the reduction in MEA performance, that there were few changes in the effective surface area of catalyst, and thus it can be seen that the reduction in MEA performance was suitably caused by the deterioration of the polymer electrolyte membrane.

Voltage of Fuel Cell Stack

Figure 6:
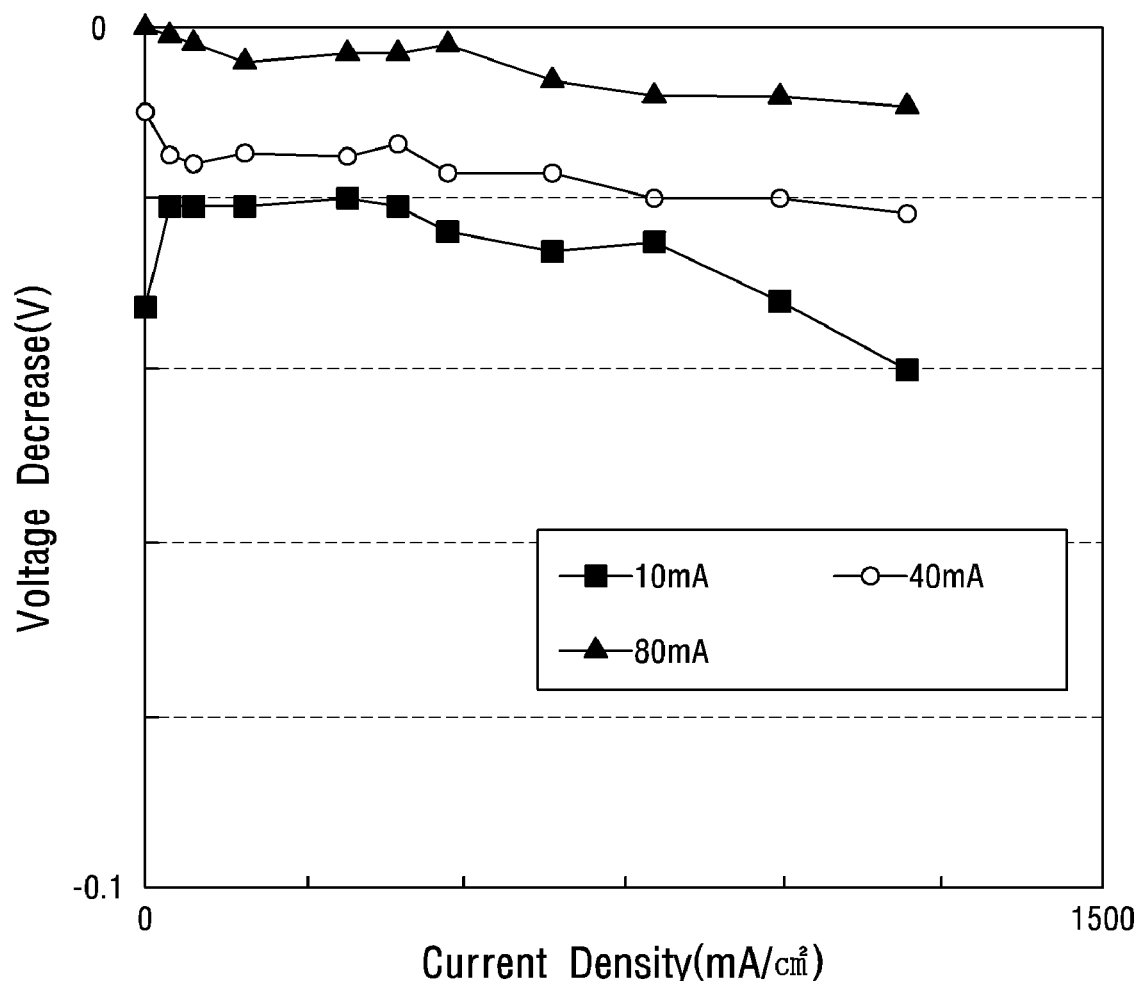
FIG. 6 is a diagram showing reduction rates of fuel cell stack performance at various current densities.
Figure 7:
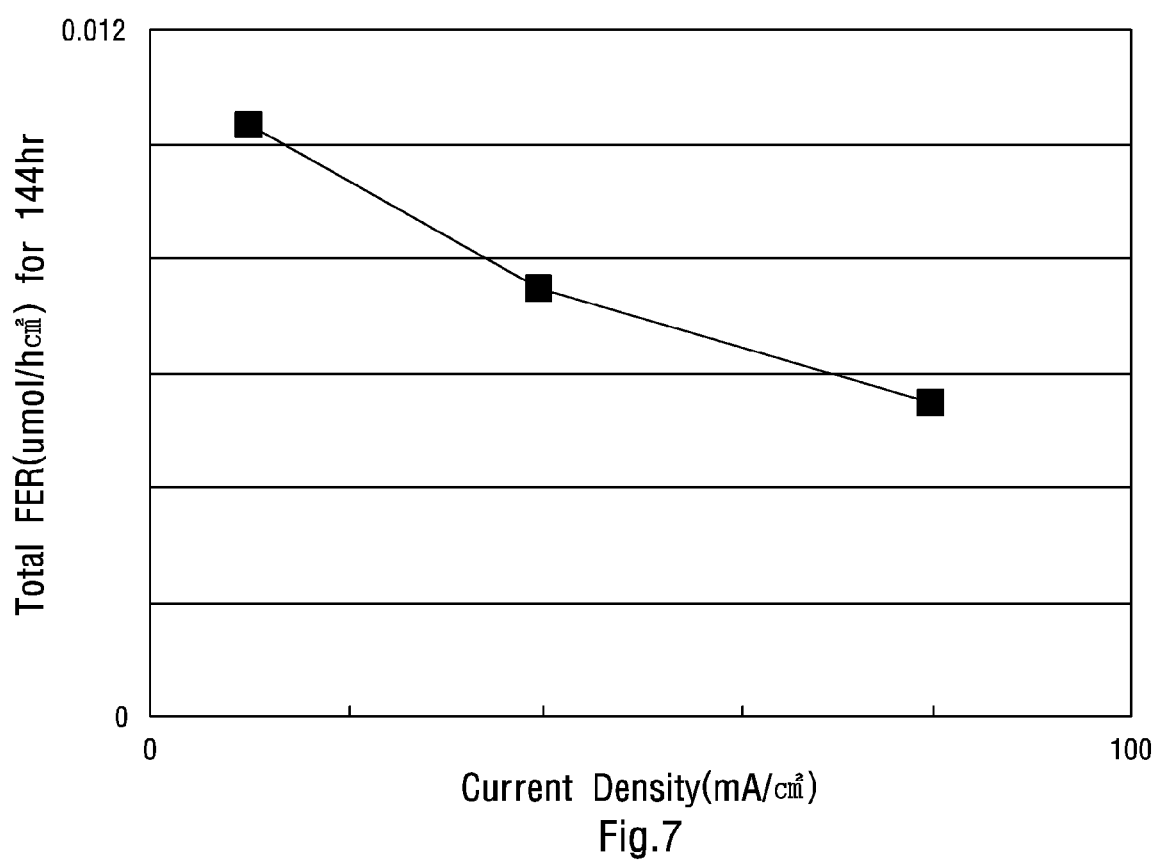
FIG. 7 is a diagram showing total fluoride emission rates at various current densities.

In further preferred embodiments of the invention as described herein, after the fuel cell stack was preferably operated at current densities of 10, 40, and 90 mA/cm$^2$ without humidification to the anode for 144 hours and kept at a constant current, the I-V characteristics were suitably measured to evaluate a difference in voltage before and after the measurement. As shown in FIG. 6, it can be seen that the more the current density was increased (i.e., the lower the voltage was), the smaller the voltage difference was, and thus the reduction in performance was small. FIG. 7 shows the total FER rates obtained after 144 hours at various current densities, in which the higher the current density, the lower the FER, which has about the same tendency in performance deterioration as shown in FIG. 6. It can be seen from FIG. 6 that the performance deterioration of the MEA is highly affected by the deterioration of the polymer electrolyte membrane. That is, according to preferred embodiments of the invention as described herein, the lower the current (i.e., the higher the voltage), the more advantageous the production of hydrogen peroxide and oxygen radicals, and the polymer electrolyte membrane is suitably deteriorated by hydrogen peroxide and oxygen radicals, which results in the increase in FER.

Relative Humidity

Figure 8:
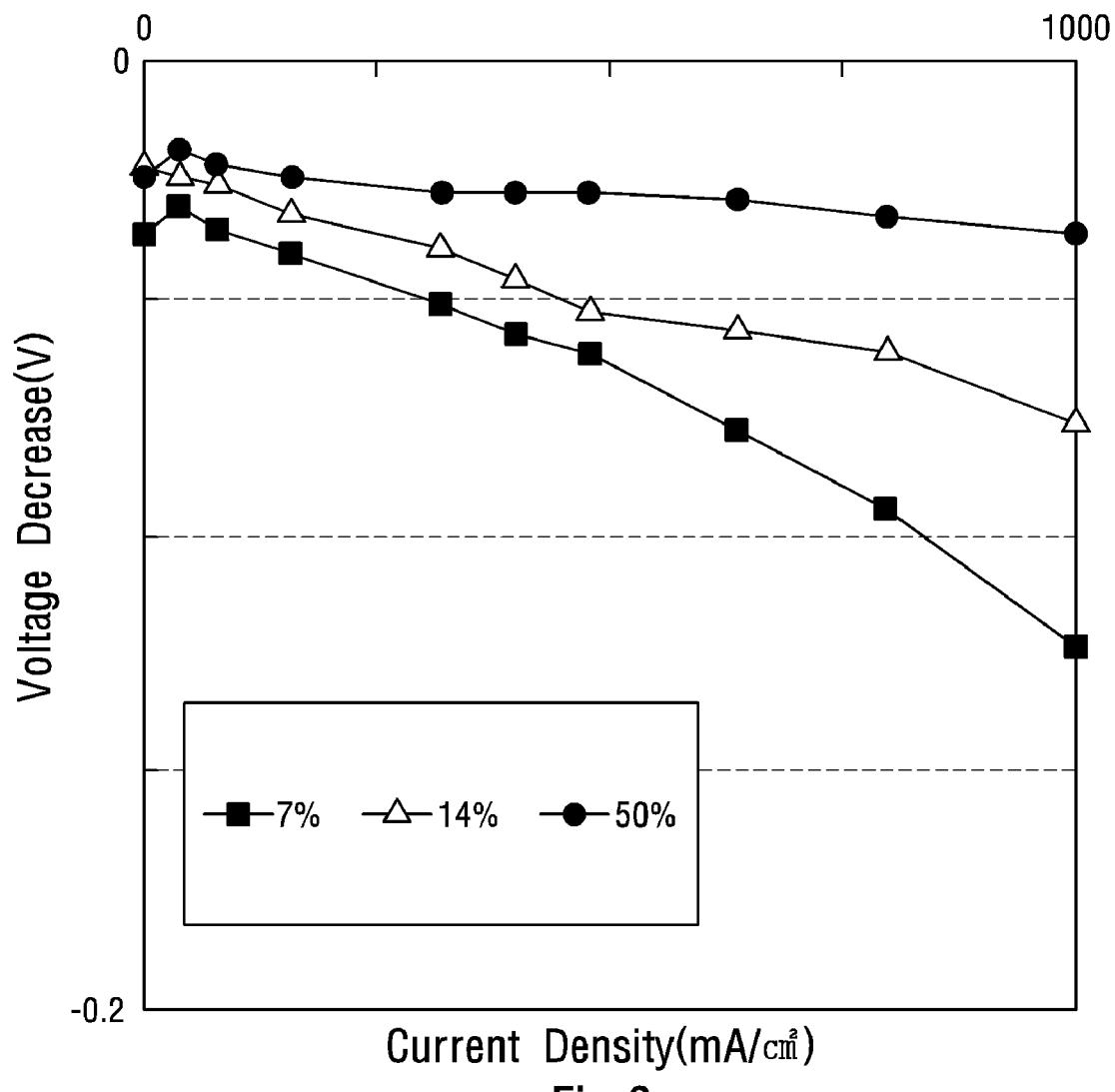
FIG. 8 is a diagram showing reduction rates of fuel cell stack performance at various relative humidities of anode.
Figure 9:
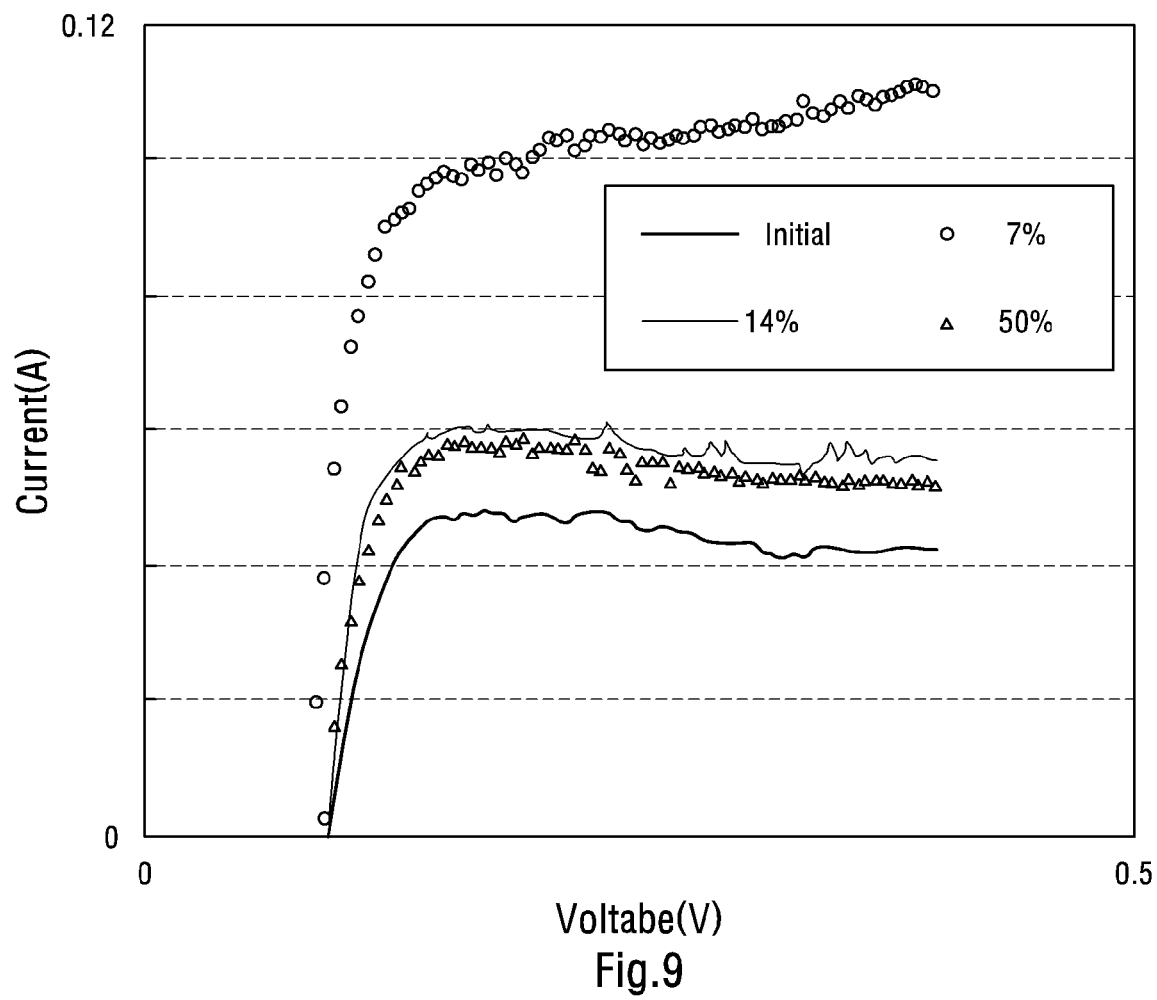
FIG. 9 is a diagram showing hydrogen permeation rates at various relative humidities of anode.

In further preferred embodiments of the invention as described herein, the fuel cell stack was preferably operated at a temperature of 90□ and at the open circuit voltage for 144 hours, in which the relative humidity of the cathode was 65% and the relative humidity of the anode was preferably changed. FIG. 8 shows the differences with MEA voltages before deterioration at various current densities. It can be seen that the MEA deterioration is suitably accelerated from the fact that the lower the relative humidity of the anode is reduced, the more the voltage difference is increased. As a result of measuring the hydrogen permeation rate of the polymer electrolyte membrane, it can be seen that the lower the relative humidity is, the more the deterioration of the membrane is accelerated, since the lower the relative humidity is reduced, the more the hydrogen permeation is increased, which results in the reduction in MEA performance.

Oxygen Partial Pressure

Figure 10:
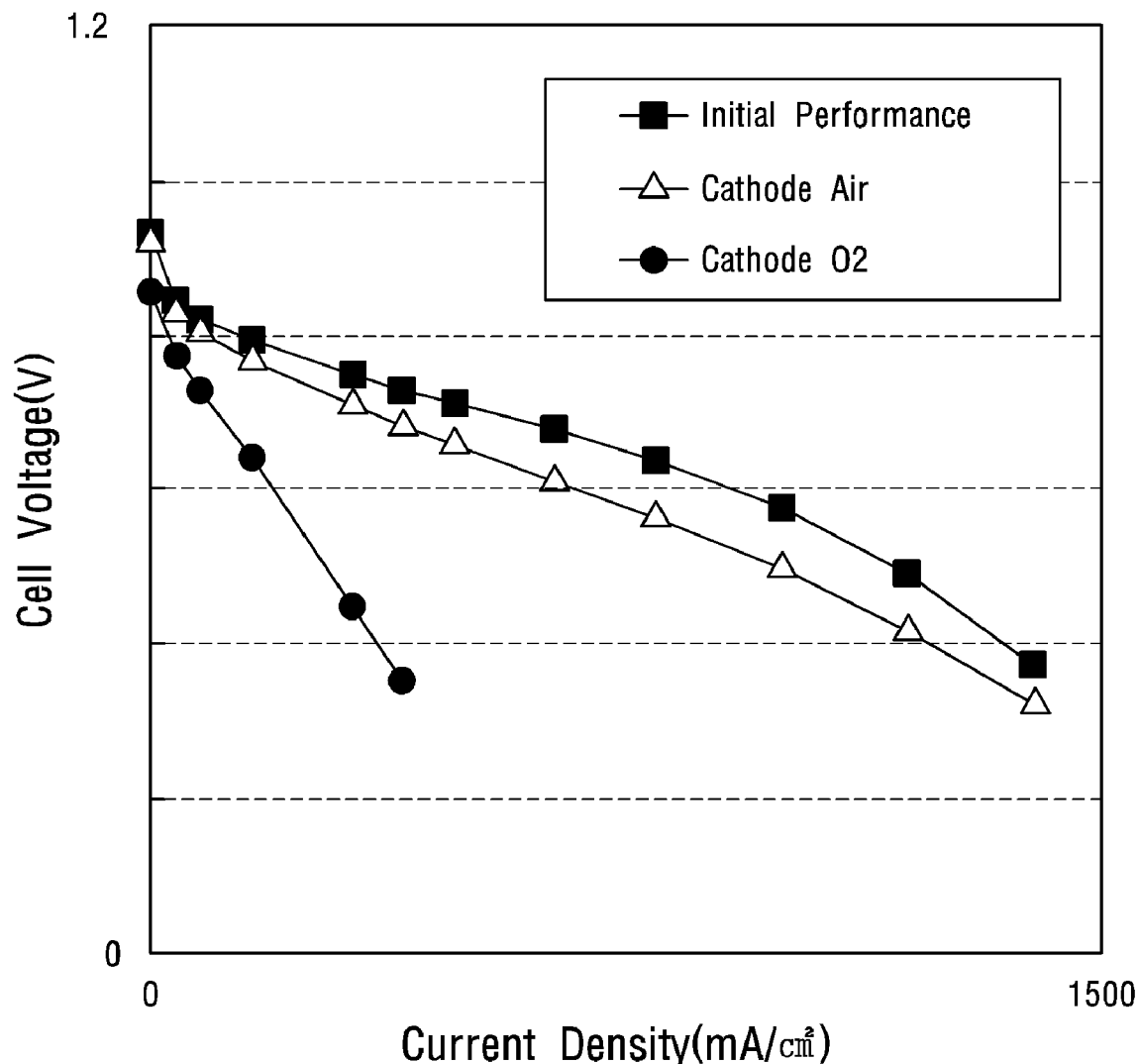
FIG. 10 is a diagram showing I-V characteristic curves after durability evaluation according to the kinds of gases used at cathode.
Figure 11:
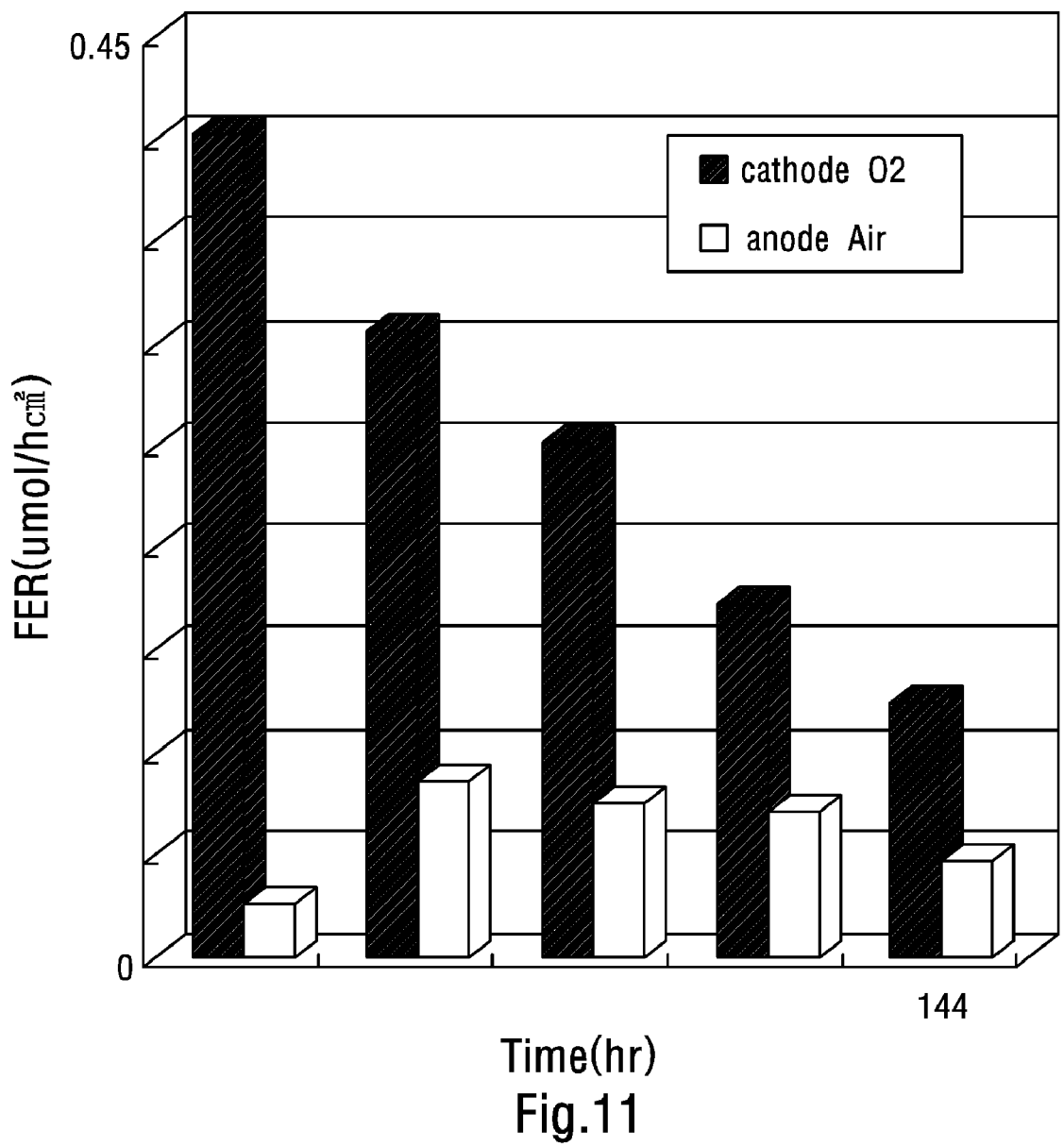
FIG. 11 is a diagram showing fluoride emission rates at various times according to the kinds of gases used at cathode.

According to other certain preferred embodiments of the invention as described herein, the fuel cell stack was preferably operated at a temperature of 90□ at the open circuit voltage for 144 hours, in which the relative humidity of the anode was 0%, that of the cathode was between 50%-75%, preferably 65%, and oxygen and air were supplied to the cathode. FIG. 10 shows IV-characteristic curves, from which it can be seen that the performance is greatly reduced in the case where oxygen is preferably used in the cathode rather than the use of air. Accordingly, the oxygen partial pressure of pure oxygen is increased about five times than that of air, which suitably increases the membrane permeation rate of oxygen. As a result, in preferred embodiments, the production of hydrogen peroxide and oxygen radical is relatively increased, which results in the acceleration of the deterioration of the membrane. FIG. 11 shows the FERs at various times according to the kinds of gases used at the cathode, from which it can be seen that the performance reduction shown in the I-V characteristic curves is caused by the suitable deterioration of the membrane since the fluoride ion emission is increased when oxygen is used.

Figure 12:
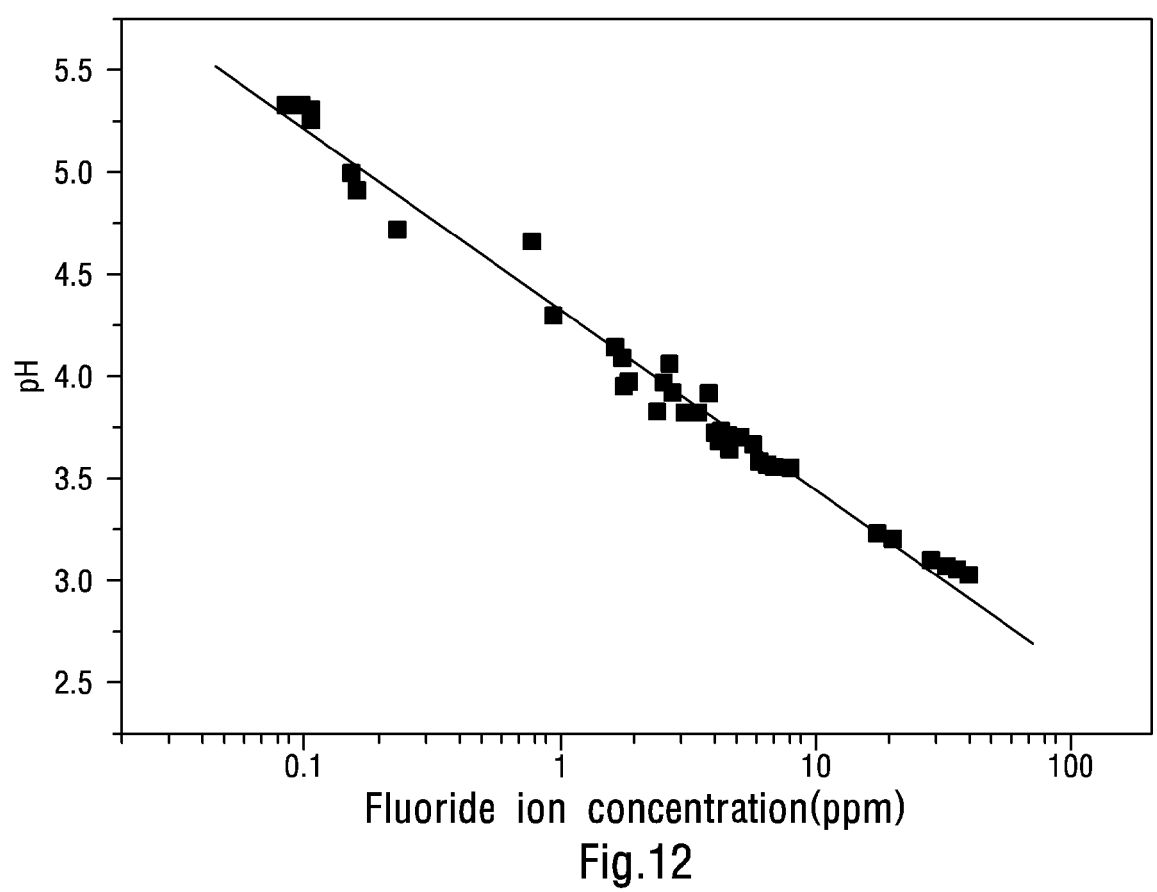
FIG. 12 is a diagram showing the proportional relationship between fluoride ion concentration and pH.

FIG. 12 shows data obtained from the fluoride ion concentration (ppm) and the pH of condensed water of the anode under various test conditions. It can be seen from FIG. 12 that the fluoride ion concentration and the pH of the condensed water are suitably correlated with each other. If fluoride anions (F$^-$) are dissolved as the electrolyte membrane is deteriorated, hydrogen cations corresponding to the fluoride anions are dissolved and, as a result, if the amount of fluoride ions is increased, the amount of hydrogen ions is also increased. Accordingly, in preferred embodiments, a close correlation between the fluoride ion concentration and the pH is made as shown in formula 2. Since the fluoride ion concentration is correlated with the pH as shown in formula 2, in other certain preferred embodiments, it is possible to use the pH meter, which is easily operated and widely used, instead of the fluoride ion meter, during the measurement of the deterioration rate of the electrolyte membrane, i.e., the fluoride emission rate (FER).

Like the condensed water of the anode, the fluoride ion concentration and the pH of the condensed water of the cathode are suitably correlated with each other. Preferably, when the fluoride ion concentration and the pH of the condensed water of the cathode are measured under various test conditions, it is possible to obtain a relationship like formula 2.

Figure 13:
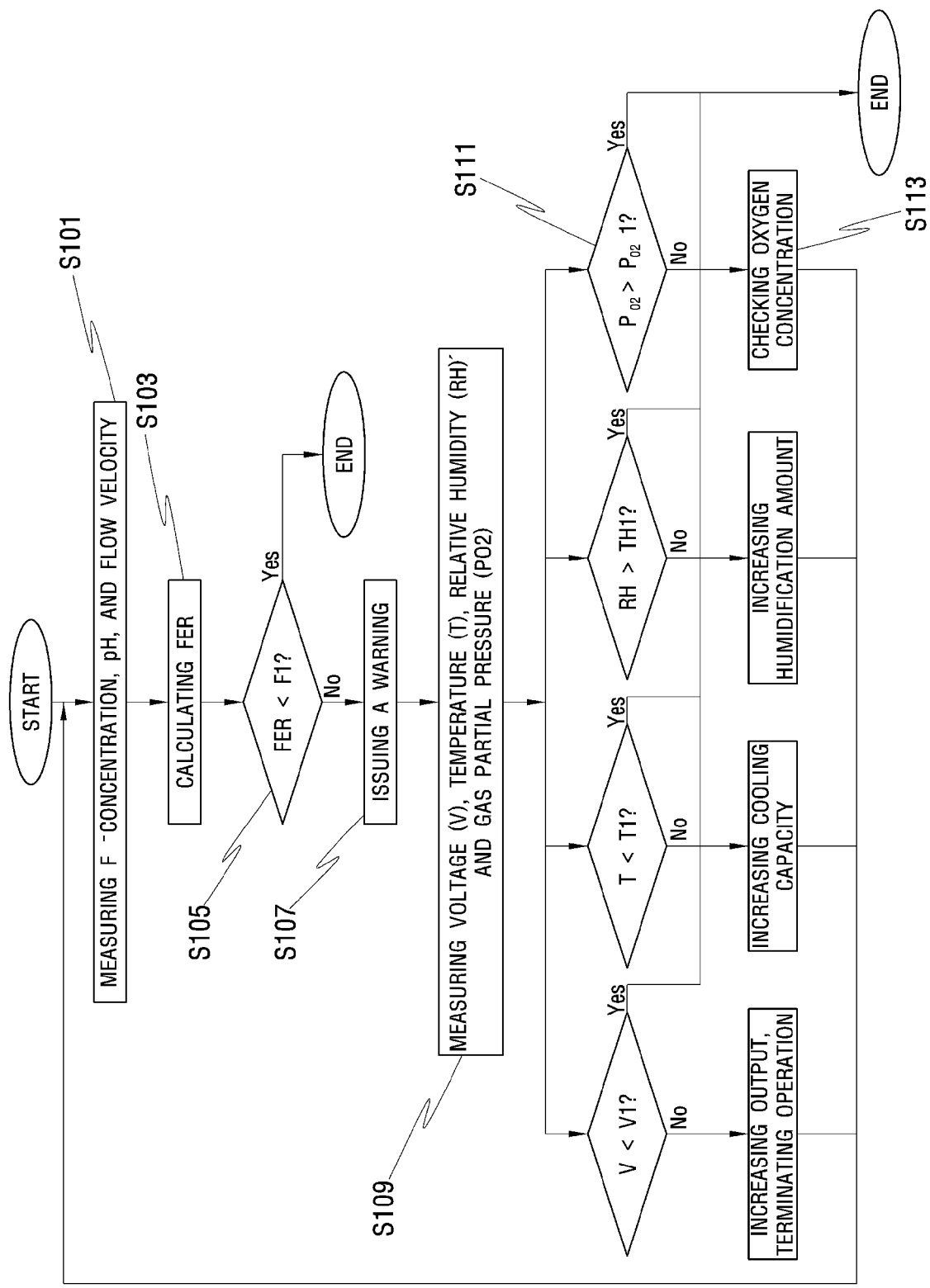
FIG. 13 is a flowchart showing a method for determining deterioration of an electrolyte membrane and preventing the deterioration of the electrolyte membrane in accordance with a preferred embodiment of the present invention.

According to exemplary embodiments, FIG. 13 is a flowchart showing a method for determining deterioration of the electrolyte membrane and preventing the deterioration of the electrolyte membrane in accordance with the present invention. Preferably, the controller 140 obtains the fluoride ion concentration and the pH of outflow water from the fuel cell stack, measured by the fluoride ion concentration meters 162 and 167 and the pH meters 161 and 166 in the condensers 120 and 130, installed at the anode and cathode outlets, respectively, and suitably stores them in a memory (S101). According to further embodiments, the fluoride ion concentration and the pH can be suitably obtained from either or both of the two condensers. In further embodiments, since the fluoride ion concentration and the pH are suitably correlated with each other as shown in formula 2, either or both of the fluoride ion concentration and the pH can be suitably used. Then, according to further exemplary embodiments, the controller calculates the fluoride emission rate (FER) using the obtained values from formula 1 (S103). At this time, the controller compares the calculated FER value with a predetermined FER value (F1) to determine the degree of deterioration of the electrolyte membrane (S105). In certain embodiments, if FER<F1, it is unnecessary to determine the deterioration, issue a warning, and take measures to prevent the deterioration of the membrane. Otherwise, in other embodiments, the controller determines that the degree of deterioration of the electrolyte membrane is above a predetermined level and issues a warning through the warning means (S107). In further embodiments, the controller preferably measures the voltage V, temperature T, relative humidity RH, and gas partial pressure (oxygen partial pressure) $P_{O2}$ using the respective sensors and suitably stores them in the memory (S109). Subsequently, the controller preferably compares the voltage, temperature, relative humidity, and gas partial pressure values with suitable predetermined values V1, T1, RH1, and $P_{O2}1$ to examine a factor that suitably accelerates the deterioration of the membrane (S111). Accordingly, in further preferred embodiments, if all four conditions, where V<V1, T<T1, RH>RH1, and $P_{O2}<P_{O2}1$, are suitably satisfied, the controller terminates the control process. In other embodiments, if there is any factor that does not suitably satisfy the conditions on membrane stability, i.e., if any one of the conditions is not suitably satisfied, the controller preferably controls the operation conditions of the vehicle and the fuel cell stack so that the corresponding factor satisfies the conditions on membrane stability, thus reducing the deterioration rate of the membrane (S113).

Accordingly, in the present invention, if it is suitably determined from the FER that the degree of deterioration of the electrolyte membrane is above a suitably predetermined level, the controller determines the deterioration, issues a suitable warning and, at the same time, examines the factors accelerating the deterioration, such as, but not limited only to, the voltage, temperature, relative humidity, and gas partial pressure of the fuel cell stack, to suitably meet the conditions on membrane stability. In particular, the controller controls the operation conditions of the vehicle and the fuel cell stack with a predetermined control process based on the factors accelerating the deterioration so that the corresponding factor can be controlled within a predetermined range for membrane stability. Accordingly, in preferred embodiments, in a state where the deterioration is determined and a warning is issued, a rapid response to prevent the deterioration is possible.

According to certain preferred embodiments of the invention as described herein, the control process for preventing the deterioration based on the respective factors is suitably performed by the controller (of the fuel cell system) controlling the operation conditions of the vehicle and the fuel cell stack, which will be described in detail below.

First, in one embodiment, if V≧V1, it is possible to suitably increase the output (i.e., current density) of the fuel cell stack 110 and charge an auxiliary power source (e.g., battery) with surplus power. In other embodiments, if V≧V1, it is possible to suitably terminate the operation of the fuel cell stack 110 and operate the vehicle using the output of the auxiliary power source. In still other embodiments, since V1 varies according to the specifications of the fuel cell stack and variation in part quality, preferably, it is necessary to set V1 by suitably evaluating the initial performance of the fuel cell stack. Preferably, in order to reduce the FER of the electrolyte membrane in the fuel cell stack 110, it is advantageous that the fuel cell stack 110 is suitably operated at cell voltages lower than V1 (above a current density of about 80 mA/cm²). Accordingly, in further embodiments, after checking the initial performance V1 (at a current density of about 80 mA/cm²) of the fuel cell stack 110, the unit cell voltages of the fuel cell stack 110 are monitored in real time during operation of the fuel cell vehicle so that the fuel cell stack 110 is controlled to be operated under the condition where V<V1, which is advantageous to prevent the deterioration of the electrolyte membrane.

In further preferred embodiments, if the operation temperature T of the fuel cell stack 110 (measured by the coolant temperature sensor at the inlet side of the fuel cell stack) is more than T1 (e.g., 70☐), the FER is rapidly increased. Accordingly, in preferred embodiments, temperature T is preferably controlled to be lower than T1 (70☐). In FIG. 13, if T≧T1 at step 111 after issuing a warning, the operation temperature T of the fuel cell stack 110 is controlled to be lower than T1 (T<T1) by controlling the flow amount of coolant of a cooling system (e.g., thermostat) of the fuel cell stack 110 to control the amount of heat radiation of a radiator 105 (shown in FIGS. 14 and 15). In other certain embodiments, since T1 varies according to the specifications of electrolyte membrane of the fuel cell stack, it is necessary to measure the amount of dissolved fluoride ions and the pH value according to the operation temperature T1 of the fuel cell stack during the evaluation of the initial performance.

In further embodiments, in order to suitably reduce the FER of the electrolyte membrane in the fuel cell stack 110, it is advantageous to control the relative humidity at the cathode and anode inlets to be higher than the predetermined value RH1 (e.g., 50%). Preferably, to control the relative humidity, if RH≦RH1 at the anode inlet (hydrogen side), it is possible to suitably control the amount of humidification by supplying outflow water stored in the condenser 120 (shown in FIG. 1) or a water trap 102 (shown in FIGS. 14 to 18) at the anode side to a hydrogen recirculation line through a humidifying water supply line using a humidifying water pump 103 during recirculation of hydrogen preferably using a hydrogen recirculation blower 104.

According to other further embodiments, if RH≦RH1 at the cathode inlet (air side), it is possible to increase the amount of humidification by suitably supplying outflow water stored the condenser 130 (shown in FIGS. 1, 14 and 18) or a water trap 102a (shown in FIGS. 16 and 17) at the cathode side to an air supply line at the cathode inlet through a humidifying water supply line preferably using a humidifying water pump 132. Otherwise, in other embodiments, it is possible to control the amount of humidification by increasing the back pressure of air in the fuel cell stack. Accordingly, the amount of humidification can be suitably increased by increasing the pressure of the cathode outlet preferably using a pressure regulator 108 (shown in FIG. 15) installed at the cathode outlet of the fuel cell stack. Accordingly, it is possible to eliminate the system for supplying outflow water stored in the condenser 130 or the water trap 102a to the air supply line at the cathode outlet, i.e., the humidifying water pump 132 and the humidifying water supply line.

According to further embodiments, since RH1 varies according to the specifications of the electrolyte membrane, electrode and GDL of the fuel cell stack 110, it is necessary to measure the amount of dissolved fluoride ions and the pH value according to the relative humidity RH1 of supply gases (i.e., reactant gases such as hydrogen and air) of the fuel cell stack during the evaluation of the initial performance.

In still further embodiments, the FER is rapidly increased if the concentration of oxygen in the air supplied to the cathode is suitably increased. Preferably, the oxygen partial pressure $P_{O2}$ in the air is suitably controlled to be at atmospheric pressure (e.g., 0.21 atm), which is suitably advantageous to the durability performance of the fuel cell stack. Preferably, the concentration of oxygen in the air supplied by the air blower 106 is measured in real time by the oxygen sensor 114 and, if determining that $P_{O2 \leq PO2}1$ based on the measured data, the controller 140 issues a suitable warning to a driver about the current state through the warning means 150 so that the vehicle can escape from the current driving situation.

Figure 14:
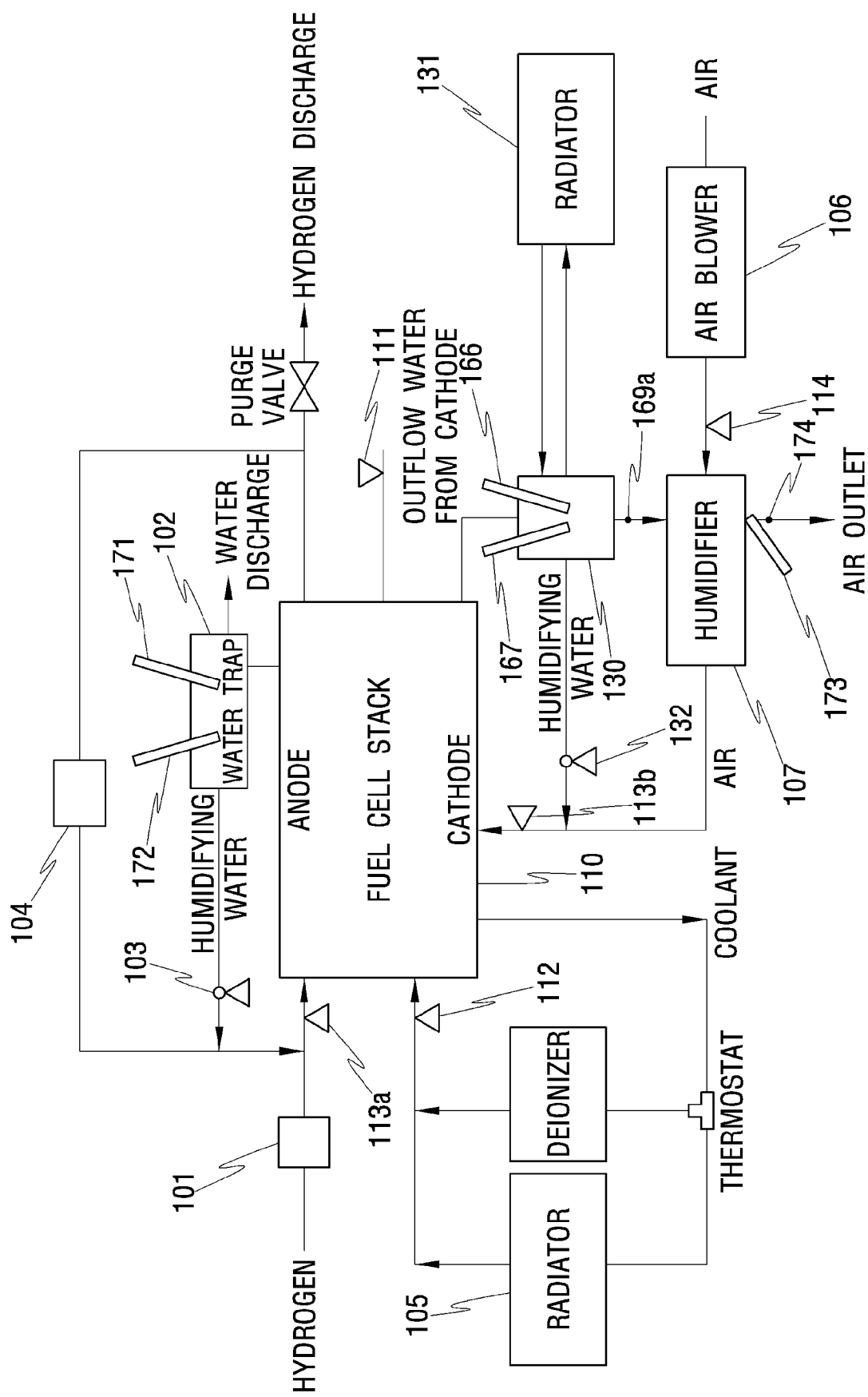
FIG. 14 is a configuration diagram of an apparatus for determining deterioration of an electrolyte membrane and a fuel cell system including the same in accordance with another preferred embodiment of the present invention.

Exemplary, FIG. 14 is a configuration diagram of a suitable apparatus for determining deterioration of an electrolyte membrane in accordance with another preferred embodiment of the present invention, in which an existing water trap 102 is used instead of the condenser installed at the anode outlet.

As shown in FIG. 1, it is possible to suitably measure the fluoride ion concentration and the pH of outflow water from the anode by preferably installing a separate condenser 120 at the anode; however, according to preferred embodiments, it is necessary to ensure a space for installing a separate condenser system including a radiator and thus the additional expenses are incurred.

Preferably, the water trap 102 is one that is already provided in the general fuel cell system, and in which outflow water from the anode is suitably stored like the condenser of FIG. 1. Preferably, water contained in the mixed gas including unreacted hydrogen and nitrogen, and vapor, discharged from the anode, is separated and collected in the water trap 102. The mixed gas from which water droplets are removed in the water trap 102 is suitably transferred to the hydrogen recirculation line, mixed with hydrogen supplied from a hydrogen tank, and suitably reintroduced into the fuel cell stack 110.

In further embodiments, either or both of a fluoride ion concentration meter 172 and a pH meter 171 may be provided at the water trap 102. Preferably, if a predetermined amount of water is stored, an electronically controlled valve (not shown) at the bottom of the water trap 102 is opened to suitably discharge the water. In further preferred embodiments, since the water trap 102 comprises upper and lower water level sensors, it is possible to suitably detect that a predetermined volume of water is filled therein. Accordingly, the controller can calculate the FER based on the time required for the predetermined volume of water to be suitably filled in the water trap during operation of the fuel cell stack after completion of water discharge and the measured value of the fluoride ion concentration meter or the pH meter (refer to formulas 1 and 2).

Preferably, in the case where the existing water trap is used without installing a separate condenser, it is possible to suitably maximize the utilization of space in the vehicle and minimize the installation cost, compared with the configuration of FIG. 1.

In other further embodiments, as shown in FIG. 14, the condenser 130 installed at the cathode outlet of the fuel cell stack 110 may be suitably connected to a humidifier 107 so that the water collected in the condenser 130 is preferably supplied to the humidifier 107 to be used to humidify the air supplied through the air blower 106.

Referring to FIG. 14, according to further embodiments of the invention, it is possible to install a pH meter 173 and a flow velocity meter 174 at the outlet of the humidifier, through which the air supplied to the cathode and the outflow water from the fuel cell stack 110 are suitably discharged, to measure the pH and the flow velocity, and suitably obtain the FER from the measured values.

Of course, in the case where the FER is obtained from the outflow water collected in the existing water trap or from the outflow water at the outlet of the humidifier, it is possible to eliminate the condenser installed at the cathode outlet of the fuel cell stack.

Meanwhile, the position for measuring the fluoride ion concentration or the pH of the outflow water from the fuel cell stack (cathode outflow water/anode outflow water) to calculate the FER, which is a criterion for determining the deterioration, may be located in various locations such as the condensers, separately installed at the anode and cathode outlets, the existing water trap, the humidifier, etc., and a part or all of the above locations may be selected.

As shown in the figure, in the case where a plurality of fluoride ion concentration meters and a plurality of pH meters are installed in the overall apparatus for determining deterioration of the electrolyte membrane, if any one of the FER data calculated from the measured values is out of the normal range, the controller determines the deterioration of the electrolyte membrane, issues a warning, and controls the factor causing the deterioration. The process for preventing the deterioration by checking the state of the electrolyte membrane and controlling the factor causing the deterioration is the same as described above.

Figure 15:
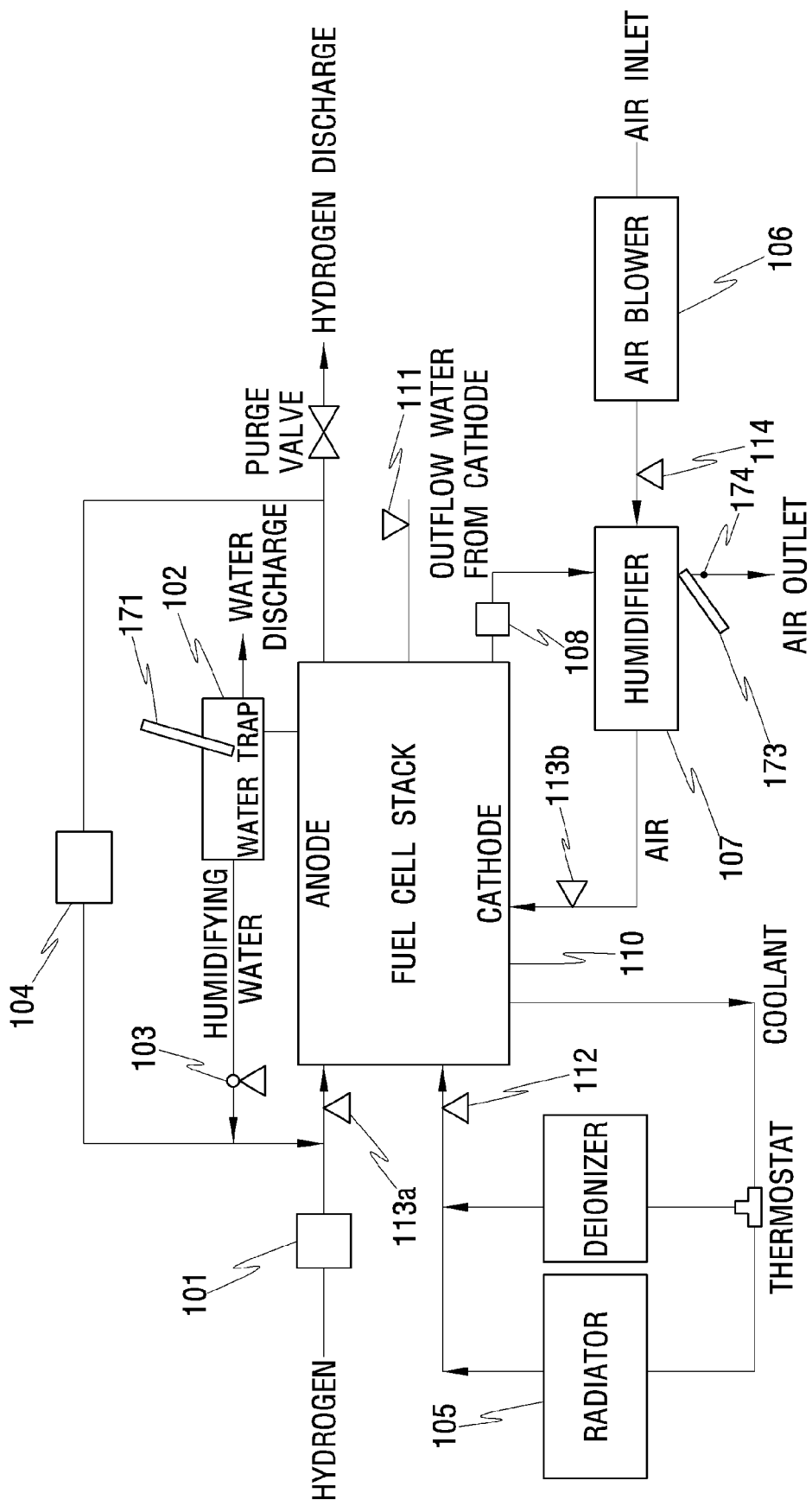
FIG. 15 is a configuration diagram of an apparatus for determining deterioration of an electrolyte membrane and a fuel cell system including the same in accordance with still another preferred embodiment of the present invention.

FIG. 15 is a configuration diagram of an apparatus for determining deterioration of an electrolyte membrane in accordance with still another preferred embodiment of the present invention. As shown in FIG. 15, it is possible to install only a pH meter 173 and a flow velocity meter 174 at the outlet of the existing humidifier 107 without installing a separate condenser at the cathode outlet of the fuel cell stack 110.

The pH meter 173 and the flow velocity meter 174 at the outlet of the humidifier 107 are preferably installed to measure the pH value and the flow velocity of outflow water from the fuel cell stack 110. Since it is possible to eliminate the condenser at the cathode outlet, it is possible to maximize the utilization of space in the vehicle and minimize the installation cost, compared with the configuration of FIG. 1. Moreover, since the fluoride ion concentration meter is relative expensive, it is possible to further reduce the installation cost by using the pH meter.

Figure 16:
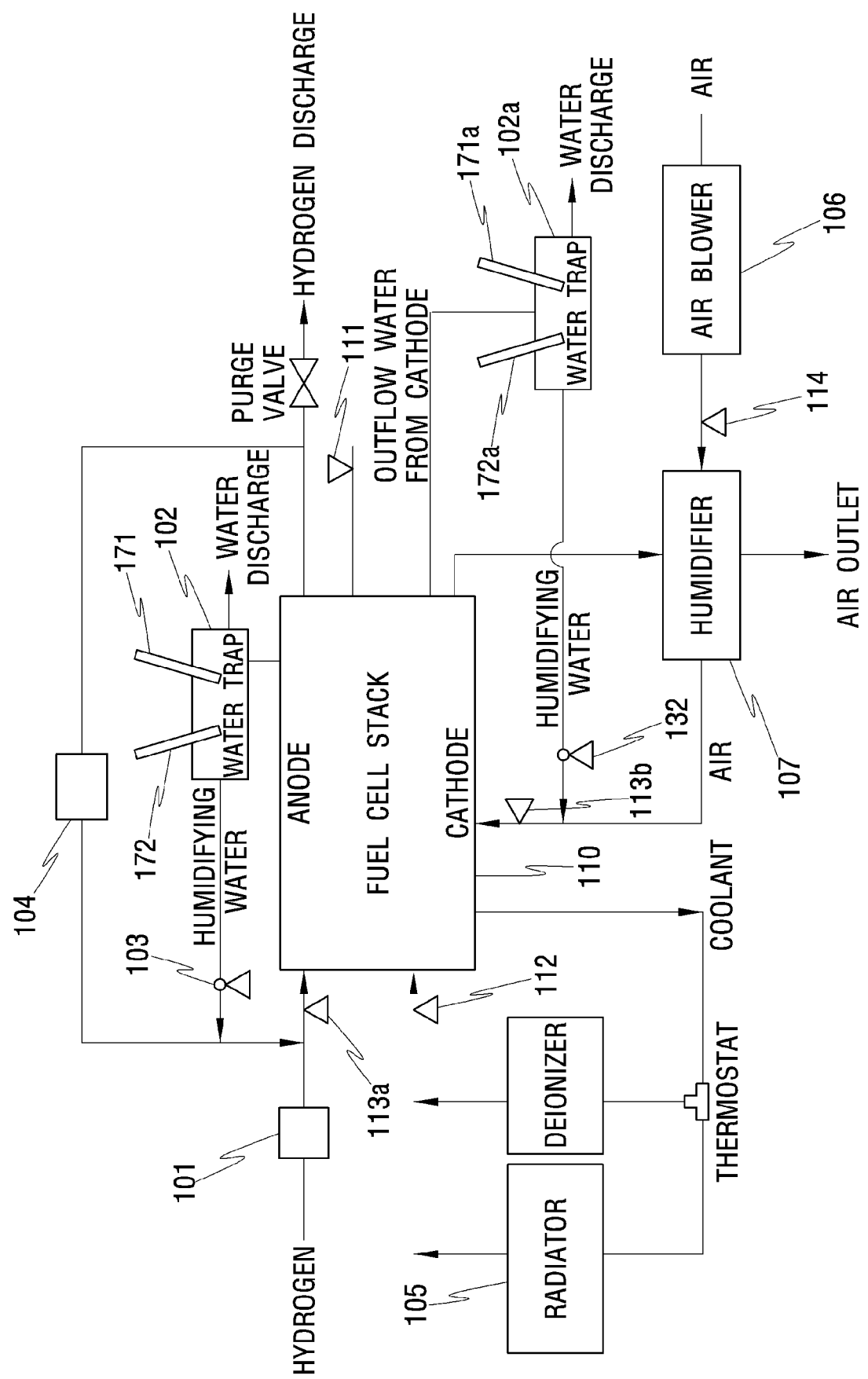
FIGS. 16 to 18 are configuration diagrams of apparatus for determining deterioration of an electrolyte membrane and fuel cell systems including the same in accordance with other preferred embodiments of the present invention.
Figure 17:
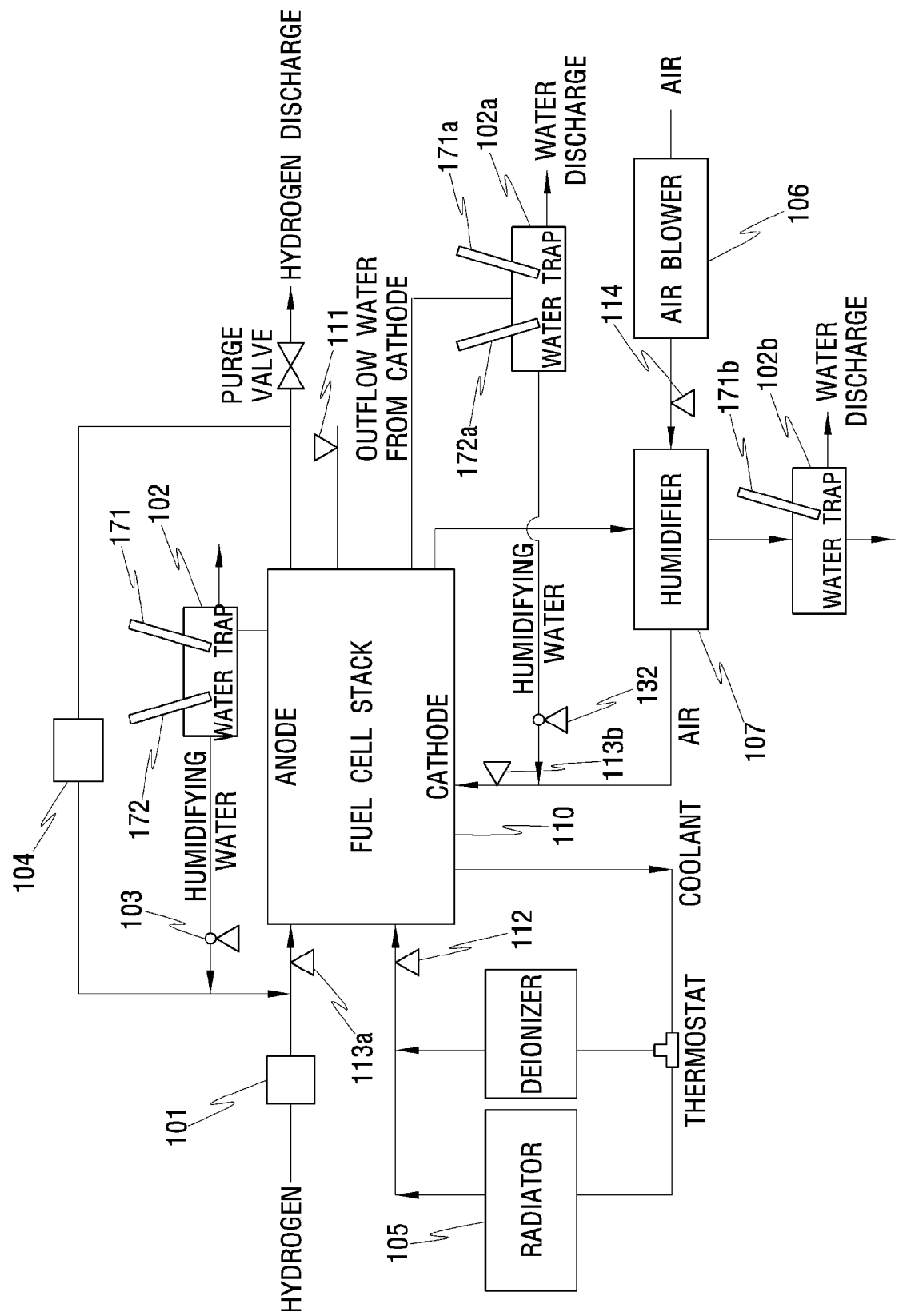
Figure 18:
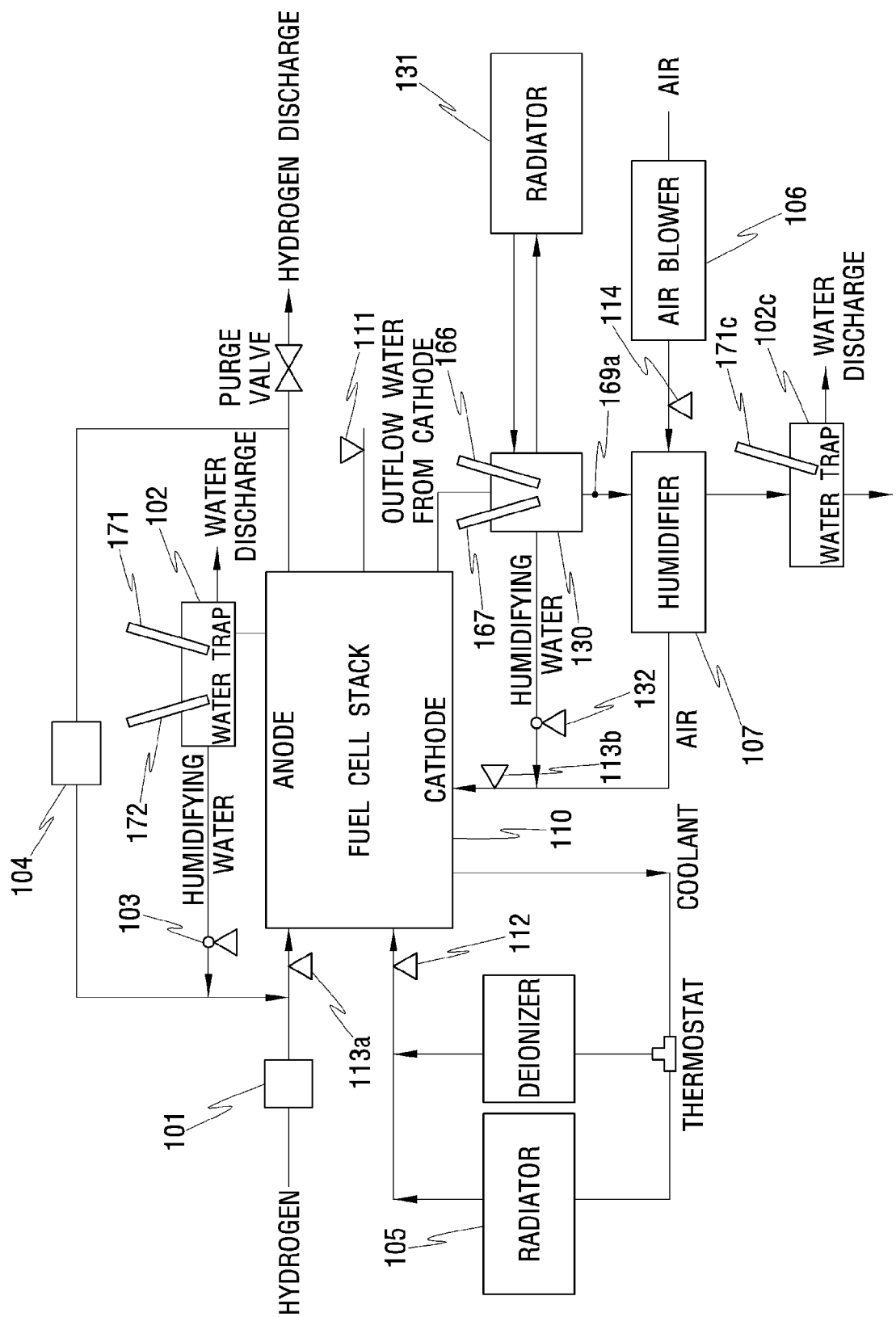

FIGS. 16 to 18 are exemplary configuration diagrams of preferred apparatus for suitably determining deterioration of an electrolyte membrane in accordance with other preferred embodiments of the present invention. Referring to FIG. 16, a water trap 102a capable of suitably measuring flow velocity data for outflow water from the cathode is preferably installed at the cathode side (air side). Preferably, either or both of a fluoride ion concentration meter 172a and a pH meter 171a are suitably installed in the water trap 102a. In further embodiments, a humidifying water supply line is suitably connected to an air supply line, and a humidifying water pump 132 is suitably installed in the humidifying water supply line so as to control the amount of air to be humidified using the water collected in the water trap 102a.

As shown in exemplary FIGS. 17 and 18, a small-sized water trap 102b, 120c (preferably including an upper water level sensor, a lower water level sensor, and a discharge valve) capable of measuring flow velocity data for outflow water from the cathode is suitably installed at the rear of the humidifier 107, separately from the water trap 102a and the condenser 130 at the cathode side. In further preferred embodiments, either or both of a fluoride ion concentration meter and a pH meter 171c are suitably installed in the water trap 102b, 102c so as to calculate the FER of outflow water collected in the water trap 102b, 102c.

Preferably, in the present invention, the fluoride ion concentration or the pH of outflow water from the fuel cell stack during operation of the fuel cell are measured in real time to calculate the FER and, if the FER is out of the normal range, the deterioration of the electrolyte membrane can be determined.

According to certain preferred embodiments, in the present invention, the factors causing the deterioration, such as, but not limited to, the operation temperature and voltage of the fuel cell stack, the relative humidity (of reactant gases supplied to the fuel cell stack), and the gas partial pressure (oxygen partial pressure in the air supplied to the fuel cell stack), are suitably examined to control the operation conditions of the vehicle and the fuel cell stack based on the factors, thus suitably preventing the deterioration of the electrolyte membrane.

As described herein, according to the apparatus and method for determining deterioration of the fuel cell in accordance with certain preferred embodiments of the present invention, it is possible to suitably determine in real time the deterioration of the electrolyte membrane of the fuel cell stack in the fuel cell vehicle during operation and take suitable measures to prevent the deterioration in the case where the deterioration is determined.

Preferably, according the method for preventing deterioration of the fuel cell in accordance with the present invention, the current state of the electrolyte membrane of the fuel cell stack is suitably checked by measuring in real time the fluoride ion concentration or pH value of outflow water from the fuel cell stack in the fuel cell vehicle during operation and, if it is suitably determined that there is a possibility of deterioration of the electrolyte membrane, the factor accelerating the current deterioration is preferably examined to control the operation conditions of the vehicle and the fuel cell stack so that the corresponding factor is controlled within a suitable predetermined range for membrane stability. Preferably, it is possible to effectively and rapidly prevent the deterioration of the electrolyte membrane and improve the performance and durability of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for determining deterioration of a fuel cell, the apparatus comprising:
    either or both of measuring devices including a fluoride ion concentration meter and a pH meter for detecting in real time fluoride ion concentration and pH of outflow water from a fuel cell stack during operation in a fuel cell vehicle;
    flow velocity measuring means for measuring the flow velocity of the outflow water from the fuel cell stack; and
    a controller for checking the state of an electrolyte membrane of the fuel cell stack by calculating a fluoride emission rate based on the measured fluoride ion concentration or pH value and flow velocity data of the outflow water from the fuel cell stack and, if the fluoride emission rate is out of a predetermined normal range, determining that there is a possibility of deterioration of the electrolyte membrane.

2. The apparatus of claim 1, wherein the measuring device is installed at each condenser provided at either or both of anode and cathode outlets of the fuel cell stack and measures the fluoride ion concentration or pH value of the outflow water collected in the condenser, and the flow velocity measuring means is a flow velocity meter installed at a water outlet side of the condenser.

3. The apparatus of claim 1, wherein the measuring device is installed at each condenser provided at either or both of anode and cathode outlets of the fuel cell stack and measures the fluoride ion concentration or pH value of the outflow water collected in each condenser, the flow velocity measuring means comprises an upper water level sensor and a lower water level sensor, installed in the condenser, and an electronically controlled valve installed at a water outlet side of the condenser, and the controller obtains flow velocity data of the outflow water from the fuel cell stack based on the volume between the lower water level sensor and the upper water level sensor in the condenser and the time required for water to be filled therein.

4. The apparatus of claim 1, wherein the measuring device is installed at either or both of water traps at anode and cathode sides of the fuel cell stack and measures the fluoride ion concentration or pH value of the outflow water collected in each water trap, the flow velocity measuring means comprises an upper water level sensor and a lower water level sensor, installed in each water trap, and an electronically controlled valve installed at a water outlet side of each water trap, and the controller obtains flow velocity data of the outflow water from the fuel cell stack based on the volume between the lower water level sensor and the upper water level sensor in each water trap and the time required for water to be filled therein.

5. The apparatus of claim 1, wherein the pH meter is installed at an outlet of a humidifier, through which air supplied to the cathode and the outflow water from the fuel cell stack are discharged, and the flow velocity measuring means is a flow velocity meter installed at the outlet of the humidifier.

6. A method for determining deterioration of a fuel cell, the method comprising:
    (a) measuring in real time fluoride ion concentration and pH of outflow water from a fuel cell stack using either or both of measuring devices including a fluoride ion concentration meter and a pH meter in a fuel cell vehicle, and measuring flow velocity of the outflow water from the fuel cell stack using flow velocity measuring means; and
    (b) checking, at a controller, the state of an electrolyte membrane of the fuel cell stack by calculating a fluoride emission rate based on the measured fluoride ion concentration or pH value and flow velocity data of the outflow water from the fuel cell stack and, if the fluoride emission rate is out of a predetermined normal range, determining that there is a possibility of deterioration of the electrolyte membrane.

7. The method of claim 6, wherein the fluoride ion concentration and pH values are measured against the outflow water collected in each condenser provided at either or both of anode and cathode outlets of the fuel cell stack, and the flow velocity is measured against water discharged from the condenser.

8. The method of claim 6, wherein the fluoride ion concentration and pH values are measured against the outflow water collected in each condenser provided at either or both of anode and cathode outlets of the fuel cell stack, and the flow velocity of the outflow water is measured based on the volume between a lower water level sensor and an upper water level sensor in the condenser and the time required for water to be filled therein.

9. The method of claim 6, wherein the fluoride ion concentration and pH values are measured against the outflow water collected in either or both of water traps at anode and cathode sides of the fuel cell stack, and the flow velocity of the outflow water is measured based on the volume between a lower water level sensor and an upper water level sensor in the water trap and the time required for water to be filled therein.

10. The method of claim 6, wherein the pH value and the flow velocity of the outflow water from the fuel cell stack are measured at an outlet of a humidifier, through which air supplied to the cathode and the outflow water from the fuel cell stack are discharged.

11. A method for preventing deterioration of a fuel cell, the method comprising:
(a) measuring in real time fluoride ion concentration and pH of outflow water from a fuel cell stack using either or both of measuring devices including a fluoride ion concentration meter and a pH meter in a fuel cell vehicle, and measuring flow velocity of the outflow water from the fuel cell stack using flow velocity measuring means;
(b) checking, at a controller, the state of an electrolyte membrane of the fuel cell stack by calculating a fluoride emission rate based on the measured fluoride ion concentration or pH value and flow velocity data of the outflow water from the fuel cell stack and, if the fluoride emission rate is out of a predetermined normal range, determining that there is a possibility of deterioration of the electrolyte membrane;
(c) examining a factor accelerating the current deterioration by measuring operation voltage, operation temperature of the fuel cell stack, relative humidity of reactant gases supplied to the fuel cell stack, or oxygen partial pressure in the air supplied to the fuel cell stack using sensing means; and
(d) controlling operation conditions of a vehicle and the fuel cell stack so that the corresponding factor is controlled within a predetermined range for membrane stability.

12. The method of claim 11, wherein, if the operation voltage of the fuel cell stack is more than a predetermined value, increasing output of the fuel cell stack and charging an auxiliary power source with surplus power so that the operation voltage of the fuel cells stack, which is the factor accelerating the deterioration, is controlled to be less than the predetermined value.

13. The method of claim 11, wherein, if the operation voltage of the fuel cell stack is more than a predetermined value, terminating the operation of the fuel cell stack and operating the vehicle using output of an auxiliary power source so that the operation voltage of the fuel cells stack, which is the factor accelerating the deterioration, is controlled to be less than the predetermined value.

14. The method of claim 11, wherein, if the operation temperature of the fuel cell stack is more than a predetermined value, controlling the flow amount of coolant of a cooling system of the fuel cell stack and the amount of heat radiation of a radiator so that the operation temperature of the fuel cells stack, which is the factor accelerating the deterioration, is controlled to be less than the predetermined value.

15. The method of claim 11, wherein, if the relative humidity of hydrogen supplied to the fuel cell stack as reactant gas is less than a predetermined value, increasing the relative humidity of hydrogen by supplying outflow water stored in a condenser or a water trap at an anode outlet to a hydrogen recirculation line through a humidifying water supply line using a humidifying water pump during recirculation of hydrogen using a hydrogen recirculation blower so that the relative humidity of hydrogen, which is the factor accelerating the deterioration, is controlled to be higher than the predetermined value.

16. The method of claim 11, wherein, if the relative humidity of hydrogen supplied to the fuel cell stack as reactant gas is less than a predetermined value, increasing the operation pressure of hydrogen by controlling a regulator at the hydrogen side so that the relative humidity of hydrogen, which is the factor accelerating the deterioration, is controlled to be higher than the predetermined value.

17. The method of claim 11, wherein, if the relative humidity of air supplied to the fuel cell stack as reactant gas is less than a predetermined value, increasing the relative humidity of air by supplying outflow water stored in a condenser or a water trap at a cathode outlet to an air supply line at a cathode inlet side through a humidifying water supply line using a humidifying water pump so that the relative humidity of air, which is the factor accelerating the deterioration, is controlled to be higher than the predetermined value.

18. The method of claim 11, wherein, if the relative humidity of air supplied to the fuel cell stack as reactant gas is less than a predetermined value, increasing back pressure of air in the fuel cell stack using a pressure regulator installed at the cathode outlet so that the relative humidity of air, which is the factor accelerating the deterioration, is controlled to be higher than the predetermined value.

19. The method of claim 11, wherein, if the oxygen partial pressure is less than a predetermined value, issuing a warning to a driver through warning means so that the vehicle escapes from the current driving situation.

20. The method of claim 11, wherein an oxygen sensor installed at an outlet of an air blower is used as a sensor for measuring the oxygen partial pressure.

* * * * *